(12) United States Patent
Tanaka et al.

(10) Patent No.: US 9,931,010 B2
(45) Date of Patent: Apr. 3, 2018

(54) AUTONOMOUSLY TRAVELING FLOOR WASHER, CLEANING SCHEDULE DATA STRUCTURE, STORAGE MEDIUM, METHOD FOR CREATING CLEANING SCHEDULE, AND PROGRAM

(71) Applicant: MURATA MACHINERY, LTD., Kyoto-shi, Kyoto (JP)

(72) Inventors: Shoji Tanaka, Kyoto (JP); Tsuyoshi Nakano, Kyoto (JP); Yoshinori Itou, Hamamatsu (JP)

(73) Assignee: MURATA MACHINERY, LTD., Kyoto (JP)

( * ) Notice: Subject to any disclaimer, the term of this patent is extended or adjusted under 35 U.S.C. 154(b) by 267 days.

(21) Appl. No.: 15/022,310

(22) PCT Filed: Sep. 1, 2014

(86) PCT No.: PCT/JP2014/072918
§ 371 (c)(1),
(2) Date: Mar. 16, 2016

(87) PCT Pub. No.: WO2015/041036
PCT Pub. Date: Mar. 26, 2015

(65) Prior Publication Data
US 2016/0287044 A1  Oct. 6, 2016

(30) Foreign Application Priority Data

Sep. 18, 2013 (JP) .................................. 2013-193320

(51) Int. Cl.
*A47L 11/40* (2006.01)
*A47L 11/16* (2006.01)
(Continued)

(52) U.S. Cl.
CPC ......... *A47L 11/4011* (2013.01); *A47L 9/2857* (2013.01); *A47L 11/161* (2013.01);
(Continued)

(58) Field of Classification Search
CPC .. A47L 11/4011; A47L 11/305; A47L 11/408; A47L 2201/04; A47L 2201/06; G05D 2201/0203
See application file for complete search history.

(56) References Cited

U.S. PATENT DOCUMENTS

2005/0132527 A1   6/2005   Pedlar et al.
2006/0064844 A1   3/2006   Venard et al.
(Continued)

FOREIGN PATENT DOCUMENTS

JP    60-57409 A    4/1985
JP    8-326025 A    12/1996
(Continued)

OTHER PUBLICATIONS

Machine translation: JPH08-326025; Akami et al. (Year: 1996).*
(Continued)

*Primary Examiner* — Mikhail Kornakov
*Assistant Examiner* — Natasha N Campbell
(74) *Attorney, Agent, or Firm* — Keating & Bennett, LLP

(57) ABSTRACT

In an autonomously traveling floor washer, a position estimating unit estimates position data. When a manual operation teaching mode is being executed, a taught data obtaining unit obtains taught position data and a taught cleaning condition at a taught data obtaining time. A cleaning schedule generation unit generates a cleaning schedule. When an autonomous cleaning mode is executed, a cleaning reproduction unit calculates and outputs a reproduced travel control command and a reproduced cleaning condition in an elapsed time based on the cleaning schedule. An elapsed
(Continued)

time determining unit determines the taught data obtaining time and the elapsed time.

9 Claims, 20 Drawing Sheets

(51) Int. Cl.
    *A47L 9/28*         (2006.01)
    *A47L 11/30*       (2006.01)
    *G05D 1/02*        (2006.01)
    *G05D 1/00*        (2006.01)

(52) U.S. Cl.
    CPC ......... *A47L 11/305* (2013.01); *A47L 11/4008* (2013.01); *A47L 11/4044* (2013.01); *A47L 11/4083* (2013.01); *A47L 11/4088* (2013.01); *G05D 1/0088* (2013.01); *G05D 1/0221* (2013.01); *A47L 2201/04* (2013.01); *G05D 2201/0203* (2013.01)

(56) References Cited

U.S. PATENT DOCUMENTS

| | | |
|---|---|---|
| 2006/0124770 A1 | 6/2006 | Venard et al. |
| 2006/0156498 A1 | 7/2006 | Venard et al. |
| 2009/0094784 A1 | 4/2009 | Pedlar et al. |
| 2012/0291218 A1 | 11/2012 | Pedlar et al. |
| 2013/0239359 A1 | 9/2013 | Pedlar et al. |
| 2014/0130292 A1 | 5/2014 | Pedlar et al. |

FOREIGN PATENT DOCUMENTS

| | | |
|---|---|---|
| JP | 3568833 B2 | 9/2004 |
| JP | 2011-30888 A | 2/2011 |

OTHER PUBLICATIONS

Official Communication issued in International Patent Application No. PCT/JP2014/072918, dated Dec. 2, 2014.
English translation of Official Communication issued in corresponding International Application PCT/JP2014/072918, dated Mar. 24, 2016.

* cited by examiner

| | | | | | | |
|---|---|---|---|---|---|---|
| $T_0$ | $x_0$ | $y_0$ | $\theta_0$ | $S_0$ | $W_0$ | $P_0$ |
| $T_1$ | $x_1$ | $y_1$ | $\theta_1$ | $S_1$ | $W_1$ | $P_1$ |
| $T_2$ | $x_2$ | $y_2$ | $\theta_2$ | $S_2$ | $W_2$ | $P_2$ |
| $T_3$ | $x_3$ | $y_3$ | $\theta_3$ | $S_3$ | $W_3$ | $P_3$ |
| ⋮ | | | | | | |
| $T_{n-1}$ | $x_{n-1}$ | $y_{n-1}$ | $\theta_{n-1}$ | $S_{n-1}$ | $W_{n-1}$ | $P_{n-1}$ |
| $T_n$ | $x_n$ | $y_n$ | $\theta_n$ | $S_n$ | $W_n$ | $P_n$ |

AUTONOMOUSLY TRAVELING FLOOR WASHER, CLEANING SCHEDULE DATA STRUCTURE, STORAGE MEDIUM, METHOD FOR CREATING CLEANING SCHEDULE, AND PROGRAM

BACKGROUND OF THE INVENTION

1. Field of the Invention

The present invention relates to an autonomously traveling floor washer that autonomously travels and cleans by reproducing a taught cleaning condition and travel route.

2. Description of the Related Art

Conventionally, there is known a washer that cleans a floor surface by user's operation (see, for example, Japanese Patent No. 3568833). In this washer, a cleaning worker operates the operation handle disposed in the rear part of the vehicle body so that the vehicle body travels and a washing brush or pad rotates to clean the floor surface, and dirty water after washing is sucked with a squeegee.

The self-propelled walking type floor surface washer disclosed in Japanese Patent No. 3568833 performs cleaning of a floor surface by user's operation. For this reason, at least one worker is necessary for one self-propelled walking type floor surface washer. On the other hand, cleaning workers for cleaning floor surfaces of buildings or the like are insufficient in number. In addition, some skill is required for washing a floor surface. For this reason, in the case where fewer skilled cleaning workers clean a large area of a building or the like, it is desired to use a washer that autonomously performs the cleaning work without necessity of the cleaning worker's operation.

SUMMARY OF THE INVENTION

Accordingly, preferred embodiments of the present invention provide a floor washer that autonomously cleans a floor surface while faithfully reproducing cleaning work done by a skilled cleaning worker without the necessity of a skilled cleaning worker's operation.

A plurality of preferred embodiments of the present invention are described below. Various features and elements of these preferred embodiments can be arbitrarily combined as necessary.

An autonomously traveling floor washer according to one aspect of various preferred embodiments of the present invention autonomously travels and cleans by reproducing a taught cleaning condition and a taught travel route. The autonomously traveling floor washer includes a cleaning unit, a traveling unit, a position estimating unit, a cleaning condition teaching unit, a travel route teaching unit, a taught data obtaining unit, a cleaning schedule generation unit, a cleaning reproduction unit, and an elapsed time determining unit.

The cleaning unit cleans a floor surface in accordance with a cleaning condition.

The traveling unit travels in accordance with an operator's operation or a travel control command.

The position estimating unit estimates position data. The position data includes information regarding a position and a direction of the traveling unit on the travel route in a predetermined coordinate system.

The cleaning condition teaching unit accepts an input of the cleaning condition by the operator and outputs the cleaning condition to the cleaning unit.

The travel route teaching unit accepts an operation of moving the traveling unit by the operator.

The taught data obtaining unit obtains taught position data and a taught cleaning condition at a taught data obtaining time when a manual operation teaching mode is executed. Here, the manual operation teaching mode is an operation mode in which the operator's operation teaches the cleaning condition and the travel route in the autonomously traveling floor washer. In addition, the taught position data is position data estimated by the position estimating unit in the manual operation teaching mode. Further, the taught cleaning condition is a cleaning condition taught by the cleaning condition teaching unit in the manual operation teaching mode.

The cleaning schedule generation unit generates and stores a cleaning schedule in which the taught position data and the taught cleaning condition are associated with the taught data obtaining time.

The cleaning reproduction unit calculates a reproduced travel control command and a reproduced cleaning condition at a predetermined elapsed time from start of execution of an autonomous cleaning mode based on the taught data obtaining time, the taught cleaning condition, and the taught position data stored in the cleaning schedule, when the autonomous cleaning mode is executed. Further, the cleaning reproduction unit outputs the reproduced travel control command and the reproduced cleaning condition to the traveling unit and the cleaning unit, respectively. Here, the autonomous cleaning mode is an operation mode in which the autonomously traveling floor washer performs autonomous traveling and cleaning without necessity of the operator's operation. The elapsed time determining unit determines the taught data obtaining time and the predetermined elapsed time.

This autonomously traveling floor washer reproduces the cleaning condition and the travel route taught by the operator by the following steps.

When the operator teaches the cleaning work (when the manual operation teaching mode is executed):

(i) the taught data obtaining unit obtains the operation of the traveling unit and the cleaning unit by the operator at the taught data obtaining time, and (ii) the cleaning schedule generation unit generates and stores the cleaning schedule in which the taught data obtaining time, the taught position data, and the taught cleaning condition are associated with each other.

When the autonomously traveling floor washer performs autonomous cleaning (when the autonomous cleaning mode is executed):

(iii) the cleaning reproduction unit calculates a cleaning condition (reproduced cleaning condition) and a travel control command (reproduced travel control command) to be output at a predetermined elapsed time from start of execution of the autonomous cleaning mode, based on the taught data obtaining time, the taught position data, and the taught cleaning condition stored in the cleaning schedule, and (iv) controls cleaning unit based on the reproduced cleaning condition and controls the traveling unit based on the reproduced travel control command.

In the step (ii), the cleaning schedule generation unit generates and stores the cleaning schedule. Accordingly, once the operator's operation is taught to the autonomously traveling floor washer, the autonomously traveling floor washer can autonomously perform the taught cleaning work any number of times without necessity of the operator's operation (teaching).

In addition, in this autonomously traveling floor washer, in the steps (i) and (ii), the taught data (the taught cleaning condition and the taught position data) are obtained and stored at the taught data obtaining time. Further, the taught data obtaining time is determined by the elapsed time determining unit.

In other words, when the manual operation teaching mode is executed, the autonomously traveling floor washer autonomously obtains the taught data. Accordingly, the operator who teaches the cleaning work to the autonomously traveling floor washer can teach the cleaning work (cleaning schedule) to the autonomously traveling floor washer in the same manner as performing the cleaning work using the conventional manual operation type floor surface washer or the like, without any consideration of generating and storing the cleaning schedule.

The cleaning unit may include a washing liquid supplying unit, a floor surface washing unit, and a sucking unit. The washing liquid supplying unit supplies washing liquid to the floor surface. The floor surface washing unit includes a washing member to be pressed to the floor surface while rotating to wash the floor surface. The sucking unit sucks the washing liquid on the floor surface.

In addition, in this case, a supply amount of the washing liquid supplied from the washing liquid supplying unit, a floor surface washing power of the floor surface washing unit, and a washing liquid sucking power of the sucking unit may be arbitrarily adjustable as the cleaning condition.

Thus, the cleaning unit can perform various cleaning operations (namely, various cleaning conditions).

The autonomously traveling floor washer may further include a display unit. The display unit displays the cleaning condition. Thus, the operator who teaches the cleaning schedule to the autonomously traveling floor washer can perform the cleaning work while checking the cleaning condition.

The autonomously traveling floor washer may further include a squeegee unit. The squeegee unit is attached to be arbitrarily set to contact with the floor surface or to be spaced away from the floor surface. In this case, the squeegee unit may be spaced away from the floor surface when traveling backward. Thus, the autonomously traveling floor washer can collect liquid such as the washing liquid and etc. on the floor surface.

The autonomously traveling floor washer may further include a cleaning schedule modifying unit. The cleaning schedule modifying unit modifies the taught cleaning condition, the taught position data, and the taught data obtaining time of the cleaning schedule. Thus, the cleaning schedule can be modified after teaching the cleaning schedule.

In the autonomously traveling floor washer, the elapsed time from start of execution of the autonomous cleaning mode may be determined based on the position data estimated by the position estimating unit. Thus, the autonomously traveling floor washer is able to autonomously reproduce the cleaning work while precisely grasping timing and place to perform the taught cleaning condition when the autonomous cleaning mode is executed.

A data structure of a cleaning schedule according to another aspect of various preferred embodiments of the present invention is in use to calculate a cleaning condition and a travel control command at a predetermined timing when an autonomously traveling floor washer including a cleaning unit and a traveling unit autonomously travels and cleans by reproducing a taught cleaning condition and a taught travel route. The cleaning unit cleans a floor surface in accordance with the cleaning condition. The traveling unit travels in accordance with an operator's operation or the travel control command.

The data structure of a cleaning schedule includes an elapsed time information storing area, a cleaning condition storing area, and a position data storing area. The elapsed time information storing area stores elapsed time information. Here, the elapsed time information is information regarding an elapsed time from start of control of the cleaning unit and the traveling unit. The cleaning condition storing area stores the cleaning condition at the elapsed time indicated in the elapsed time information. The position data storing area stores position data at the elapsed time indicated in the elapsed time information.

In this case, the predetermined timing is determined based on the elapsed time information stored in the elapsed time information storing area. In addition, the cleaning condition at the predetermined timing is calculated based on the cleaning condition stored in the cleaning condition storing area and associated with the elapsed time information corresponding to the predetermined timing. Further, the travel control command at the predetermined timing is calculated based on the position data stored in the position data storing area and associated with the elapsed time information corresponding to the predetermined timing.

In the cleaning schedule including the data structure described above, the cleaning condition and the position data are stored in association with the elapsed time from start of control of the cleaning unit and the traveling unit. Thus, various cleaning works are able to be taught to the autonomously traveling floor washer.

In addition, when the autonomous traveling and cleaning is performed (when the autonomous cleaning mode is executed), the cleaning condition (reproduced cleaning condition) and the travel control command (reproduced travel control command) at a predetermined timing are calculated based on the cleaning condition and the position data stored in the cleaning schedule and associated with the elapsed time corresponding to the predetermined timing. Thus, the autonomously traveling floor washer is able to autonomously reproduce various cleaning works.

A storage medium according to still another aspect of various preferred embodiments of the present invention is a storage medium storing the cleaning schedule having the data structure described above.

A method of generating a cleaning schedule according to still another aspect of various preferred embodiments of the present invention is preferably used in an autonomously traveling floor washer that autonomously travels and cleans by reproducing a taught cleaning condition and a taught travel route. The method of generating the cleaning schedule includes the steps of: causing the autonomously traveling floor washer to perform a cleaning work based on an operator's operation; causing the autonomously traveling floor washer to travel based on an operator's operation; estimating taught position data including information regarding a position and an direction of the autonomously traveling floor washer on the travel route in a predetermined coordinate system determined in the autonomously traveling floor washer; obtaining the taught position data and a taught cleaning condition as the cleaning condition when the cleaning work is being performed, at the taught data obtaining time determined in the autonomously traveling floor washer; and storing the taught position data and the taught cleaning condition in association with the taught data obtaining time so as to generate the cleaning schedule.

According to the method of generating the cleaning schedule described above, it is possible to easily generate the cleaning schedule in which the taught position data and the taught cleaning condition are associated with the taught data obtaining time.

According to still another aspect of various preferred embodiments of the present invention, a non-transitory computer readable medium has stored thereon a program for causing a computer to execute the above-mentioned method of generating a cleaning schedule.

Autonomously traveling floor washers according to preferred embodiments of the present invention is able to autonomously clean a floor surface while faithfully reproducing a cleaning work of a skilled cleaning worker without necessity of an operation by a skilled cleaning worker.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17B is a diagram illustrating a cleaning schedule to which the cleaning schedule unit is added.

DETAILED DESCRIPTION OF THE PREFERRED EMBODIMENTS

Figure 1:
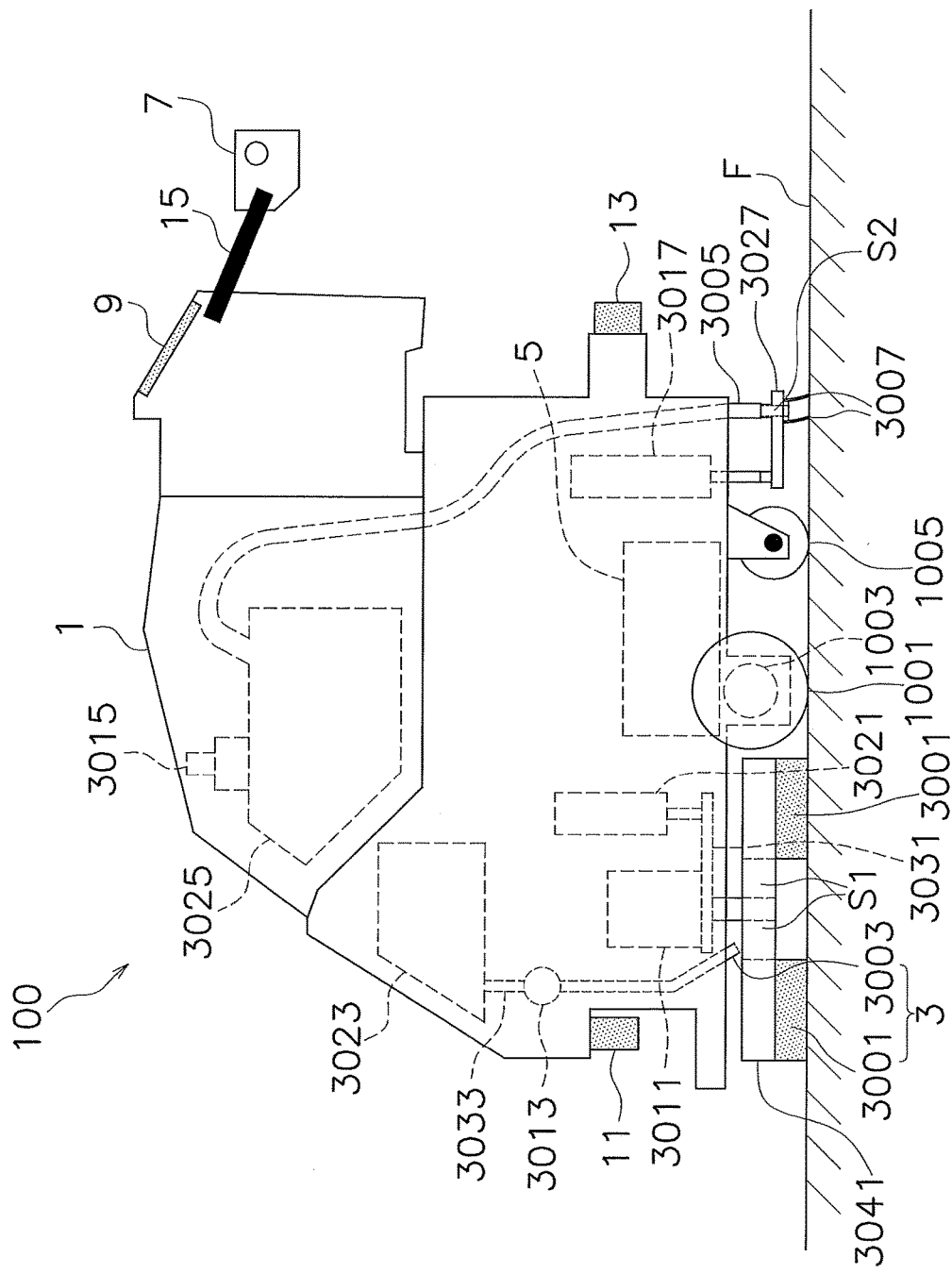
FIG. 1 is a diagram illustrating an overall structure of an autonomously traveling floor washer.

1. First Preferred Embodiment (1) Overall Structure of Autonomously Traveling Floor Washer First, an overall structure of an autonomously traveling floor washer according to this preferred embodiment is described with reference to FIG. 1. FIG. 1 is a diagram illustrating an overall structure of an autonomously traveling floor washer 100. The autonomously traveling floor washer 100 illustrated in FIG. 1 autonomously performs a cleaning work by faithfully reproducing a taught cleaning condition and a taught travel route. The "taught cleaning condition" means a cleaning condition when the autonomously traveling floor washer 100 performs a cleaning work by an operator's manual operation when the autonomously traveling floor washer 100 is in a state capable of the manual operation. In addition, the "taught travel route" means a route along which the autonomously traveling floor washer 100 travels by the operator's manual operation (moving operation).

The autonomously traveling floor washer 100 includes a traveling unit 1, a cleaning unit 3, a control unit 5, a travel route teaching unit 7, a setting unit 9, a front detector 11, and a rear detector 13.

The traveling unit 1 is a device that travels in accordance with an operator's operation or a travel control command. In addition, left and right ends of the bottom portion of the traveling unit 1 are equipped with main wheels 1001, travel motors 1003, and auxiliary wheels 1005, respectively.

The main wheels 1001 are attached to output rotation shafts of the travel motors 1003. Accordingly, the main wheels 1001 are able to be rotated by the travel motors 1003.

In addition, the travel motors 1003 are electrically connected to a control unit 5 (described later). Accordingly, the travel motors 1003 are controlled based on a travel control command (described later) generated by the control unit 5. Thus, the main wheels 1001 cause the traveling unit 1 to travel in accordance with the travel control command.

The auxiliary wheels 1005 are attached to the left and right ends of the bottom portion of the traveling unit 1 behind the main wheels 1001 in a rotatable manner. The auxiliary wheels 1005 enable the traveling unit 1 to stably travel. Further, in this preferred embodiment, the auxiliary wheels 1005 are attached, because only the main wheels 1001 on the left and right ends of the traveling unit 1 cannot stabilize a position of the traveling unit 1. Accordingly, if the traveling unit 1 is able to be stabilized only by the main wheels 1001, the auxiliary wheels 1005 are not necessary.

In addition, the auxiliary wheels 1005 are attached behind the main wheels 1001 in this preferred embodiment, but the position of the auxiliary wheels is not limited to this. The auxiliary wheels 1005 may be attached in front of the main wheels 1001 in consideration of the barycenter position and the like of the autonomously traveling floor washer 100.

The cleaning unit 3 is a device that cleans a floor surface F in accordance with a cleaning condition. The cleaning unit 3 is mounted on the bottomportion of the autonomously traveling floor washer 100. Specifically, the cleaning unit 3 presses a washing member 3001 (described later) to the floor surface F while rotating the same, so as to wash the floor surface F in accordance with the cleaning condition. Note that details of the cleaning unit 3 will be described later.

The control unit 5 is electrically connected to the front detector 11 (described later), the rear detector 13 (described later), the travel motors 1003, encoders 1013 (described later), a washing member rotating motor 3011 (described later), a washing member pressing actuator 3021 (described later), a washing liquid supplying pump 3013 (described later), a suction motor 3015 (described later), and a squeegee unit lift actuator 3017 (described later).

Thus, the control unit 5 controls the traveling unit 1 in accordance with the travel control command and controls the cleaning unit 3 in accordance with the cleaning condition. Note that a detailed structure of the control unit 5 will be described later. Here, the travel control command is a command that controls a rotation speed and/or rotation amounts of the travel motors 1003. In this preferred embodiment, the travel control command is expressed as a travel amount. If a current position and a target position are determined, the travel amount can be calculated from a difference between the target position and the current position. In addition, the travel amount is able to be calculated from a rotation direction and a rotation amount of handles 7001a and 7001b of the travel route teaching unit 7 (described later). Furthermore, the cleaning condition means a washing power W expressed by a rotation speed and a pressing force of the washing member 3001 (described later), a washing liquid supply amount S supplied from a washing liquid supplying unit 3003, and a suction power P of the sucking unit 3005.

The travel route teaching unit 7 has a function of accepting a moving operation of the traveling unit 1 by the operator. The travel route teaching unit 7 is attached to an upper rear side of the traveling unit 1 via an attachment member 15. Thus, the operator moves the traveling unit 1 by operating the travel route teaching unit 7. In addition, the travel route teaching unit 7 electrically connected to the control unit 5. Thus, operation amounts of the handles 7001a and 7001b (described later) are able to be transmitted to the control unit 5. Note that details of the travel route teaching unit 7 will be described later.

The setting unit 9 is attached to an upper rear side surface of the traveling unit 1. In addition, the setting unit 9 is disposed in a vicinity of the travel route teaching unit 7. Thus, the operator is able to operate the setting unit 9 while operating the traveling unit 1 by operating the travel route teaching unit 7.

In addition, the setting unit 9 is electrically connected to the control unit 5. Thus, a set value set by the setting unit 9 is able to be transmitted to the control unit 5. Note that details of the setting unit 9 will be described later.

The front detector 11 is attached to a front side end of the traveling unit 1. The front detector 11 detects an obstacle (front obstacle) existing in front of the traveling unit 1. In addition, the front detector 11 is connected to the control unit 5 so that signals are communicated. Thus, the front detector 11 is able to transmit information regarding a detected obstacle to the control unit 5.

As the front detector 11, a laser range finder (LRF) can be used, for example. When the laser range finder is used as the front detector 11, a distance between the traveling unit 1 and the front obstacle, and a direction to the front obstacle is able to be obtained as the information regarding the front obstacle.

The rear detector 13 is attached to a rear side end of the traveling unit 1. The rear detector 13 detects an obstacle (rear obstacle) existing behind the traveling unit 1. In addition, the rear detector 13 is connected to the control unit 5 so that signals are able to be communicated. Thus, the rear detector 13 is able to transmit information regarding a detected obstacle to the control unit 5.

As the rear detector 13, a laser range finder (LRF) having a detection range of 180 degrees or larger can be used, for example. When the laser range finder is used as the rear detector 13, a distance between the traveling unit 1 and the rear obstacle, and a direction to the rear obstacle is able to be obtained as information regarding the rear obstacle.

(2) Structure of Cleaning Unit

Next, a structure of the cleaning unit 3 is described with reference to FIG. 1. The cleaning unit 3 washes the floor surface F in accordance with the cleaning condition. The cleaning unit 3 includes the washing member 3001, the washing liquid supplying unit 3003, the sucking unit 3005, and a squeegee unit 3007.

The washing member 3001 is disposed on the front bottom surface of the traveling unit 1. In addition, the washing member 3001 is fixed to a fixing member 3041. Further, the fixing member 3041 is connected to an output rotation shaft of the washing member rotating motor 3011. Accordingly, when the fixing member 3041 is rotated by the washing member rotating motor 3011, the washing member 3001 is also rotated. Further, the washing member 3001 is connected to the washing member pressing actuator 3021 via a pressing member 3031. Accordingly, the washing member 3001 is pressed to the floor surface F by the washing member pressing actuator 3021.

As a result, the washing member 3001 is able to wash the floor surface F while rotating and being pressed to the floor surface F. Further, by adjusting the rotation speed of the washing member rotating motor 3011 and the pressing force of the washing member pressing actuator 3021, the washing power of the washing member 3001 can be adjusted. Note that a floor surface washing brush or the like can be used as the washing member 3001.

In addition, a cavity S1 is located in the fixing member 3041, and the washing liquid supplied from the washing liquid supplying unit 3003 (described later) is supplied to the floor surface F via the cavity S1.

Note that the unit including the washing member 3001, the washing member rotating motor 3011, the washing member pressing actuator 3021, and the pressing member 3031 is an example of the floor surface washing unit in this preferred embodiment.

The washing liquid supplying unit 3003 is a hollow cylindrical member. One end of the washing liquid supplying unit 3003 is disposed at a position corresponding to the cavity S1 located in the fixing member 3041. In addition, another end of the washing liquid supplying unit 3003 is connected to an outlet side of the washing liquid supplying pump 3013 mounted inside the traveling unit 1. Further, an inlet side of the washing liquid supplying pump 3013 is connected via a pipe member 3033 to an outlet of a washing liquid supply tank 3023 mounted inside the traveling unit 1. Thus, the washing liquid supplying unit 3003 supplies the washing liquid from the washing liquid supply tank 3023 while the supply amount is controlled by the washing liquid supplying pump 3013. Further, the washing liquid is supplied from one end of the washing liquid supplying unit 3003 to the cavity S1 located in the fixing member 3041 and reaches the floor surface F after passing through the cavity S1.

Note that water can be used as the washing liquid supplied from the washing liquid supplying unit 3003.

The sucking unit 3005 is a hollow cylindrical member. One end of the sucking unit 3005 is connected to a squeegee unit fixing member 3027 (described later) provided with a suction inlet S2. Another end of the sucking unit 3005 is connected to one of upper openings of a collecting portion 3025 mounted inside the traveling unit 1. Thus, the sucking unit 3005 sucks the washing liquid and the like on the floor surface F. Further, the washing liquid and the like sucked by the sucking unit 3005 are collected into the collecting portion 3025.

In addition, the suction motor 3015 is disposed in another opening located on the upper portion of the collecting portion 3025. The suction motor 3015 decompresses the space inside the collecting portion 3025 to a negative pressure. As a result, the sucking unit 3005 becomes the negative pressure state and is able to suck the washing liquid and the like on the floor surface F into the collecting portion 3025. Further, the suction power P of the sucking unit 3005 is able to be adjusted by adjusting an output of the suction motor 3015.

The squeegee unit 3007 is fixed to the squeegee unit fixing member 3027 and disposed at the rear side on the bottom surface of the traveling unit 1. In addition, the squeegee unit 3007 is connected to the squeegee unit lift actuator 3017 via the squeegee unit fixing member 3027 and is able to be moved up and down with respect to the floor surface F. As a result, the squeegee unit 3007 can be arbitrarily set whether to contact with the floor surface F or to be away from the floor surface F. As a result, the squeegee unit 3007 prevents the liquid and the like on the floor surface F from flowing to an area behind the autonomously traveling floor washer 100, as necessary.

In addition, the squeegee unit 3007 is spaced away from the floor surface F when the autonomously traveling floor washer 100 travels backward. Thus, when traveling backward, it is possible to prevent the liquid and the like on the floor surface F from flowing to an area farther behind the autonomously traveling floor washer 100. As a result, the autonomously traveling floor washer 100 is able to efficiently wash the floor surface F.

In addition, the squeegee unit fixing member 3027 is provided with the suction inlet S2, and hence the washing liquid and dust collected by the squeegee unit 3007 are sucked by the suction power P of the sucking unit 3005 and are collected into the collecting portion 3025.

Thus, the cleaning unit 3 includes the washing member 3001, the washing liquid supplying unit 3003, the sucking unit 3005, and the squeegee unit 3007, and hence the autonomously traveling floor washer 100 is able to perform various cleaning works (various cleaning conditions) such as washing the floor surface F, and collecting the liquid and the like on the floor surface F.

(3) Structure of Travel Route Teaching Unit

Figure 2:
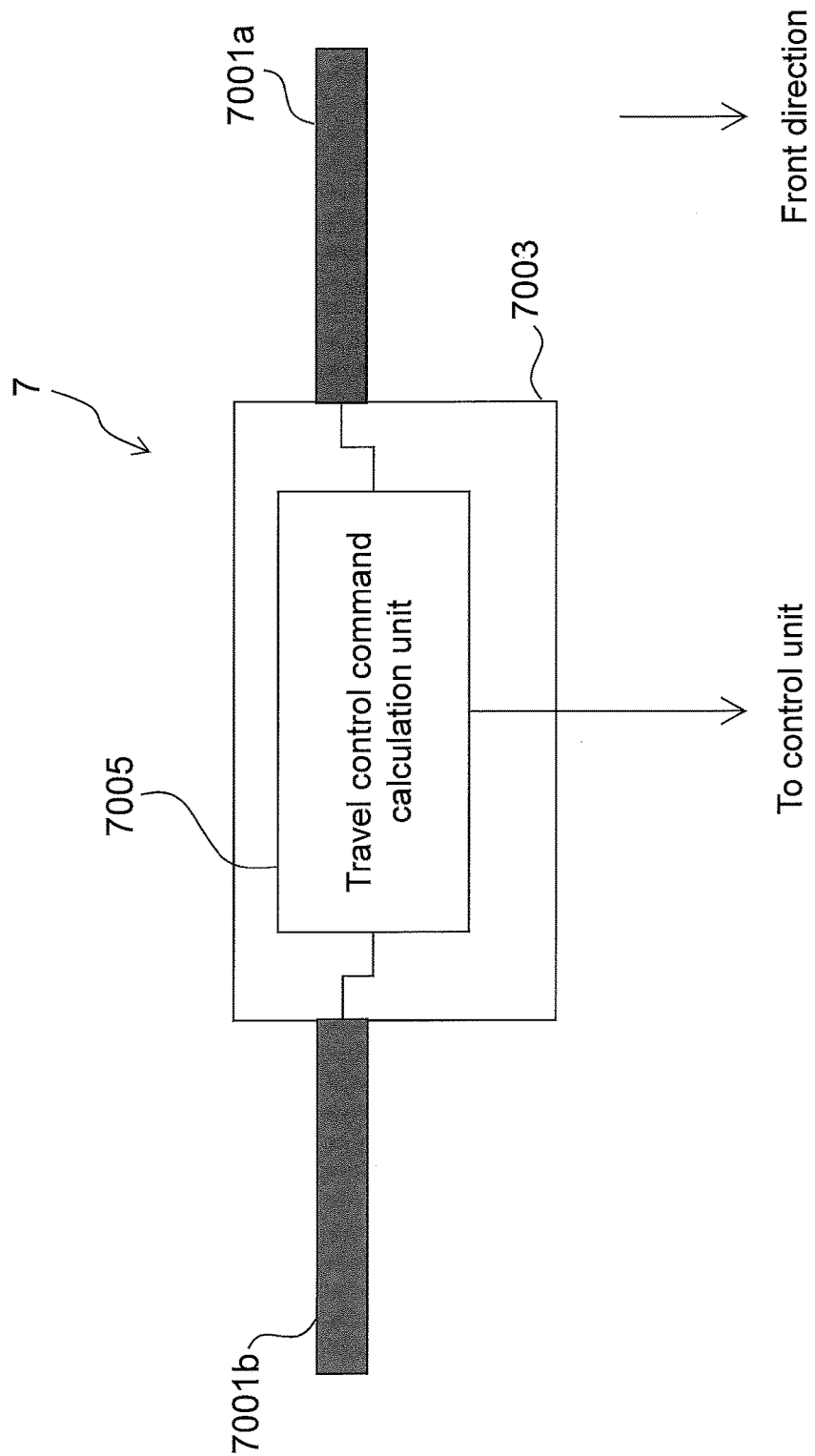
FIG. 2 is a diagram illustrating a structure of a travel route teaching unit.

Next, a structure of the travel route teaching unit 7 is described with reference to FIG. 2. FIG. 2 is a diagram illustrating a structure of the travel route teaching unit 7. The travel route teaching unit 7 includes the handles 7001a and 7001b, a case 7003, and a travel control command calculation unit 7005.

The handles 7001a and 7001b are respectively attached to left and right side surfaces of the case 7003. The operator grabbing the handles 7001a and 7001b is able to apply a force to the traveling unit 1 via the handles 7001a and 7001b in either direction of pulling to the operator or pushing the traveling unit 1.

Thus, by adjusting the forces applied to the handles 7001a and 7001b, it is possible to adjust a driving direction of the traveling unit 1. For instance, when a force of pulling the traveling unit 1 is applied to the left side handle 7001a viewed from the front side of the traveling unit 1, the traveling unit 1 changes the direction to the left.

In addition, the handles 7001a and 7001b are rotatably attached to the case 7003. In addition, the handles 7001a and 7001b are electrically connected to the travel control command calculation unit 7005. Further, the travel control command calculation unit 7005 is connected to the control unit 5 so that signals are able to be communicated. Thus, rotation amounts and rotation directions of the handles 7001a and 7001b are converted into the travel control command in the travel control command calculation unit 7005, and the travel control command is transmitted to the control unit 5. Thus, the operator can operate the traveling unit 1 also by rotation operation of the handles 7001a and 7001b.

For instance, by adjusting the rotation directions of the handles 7001a and 7001b, the operator is able to move the traveling unit 1 forward or backward. On the other hand, by adjusting the rotation amounts of the handles 7001a and 7001b, a travel speed of the traveling unit 1 is able to be adjusted. Further, by differentiating the rotation amount between the handles 7001a and 7001b, a travel direction of the traveling unit 1 can be changed. Moreover, it is possible to configure the handle 7001a as an input interface to instruct the travel speed to the travel direction and to configure the handle 7001b as an input interface to instruct a steering angle.

(4) Structure of Setting Unit

Figure 3:
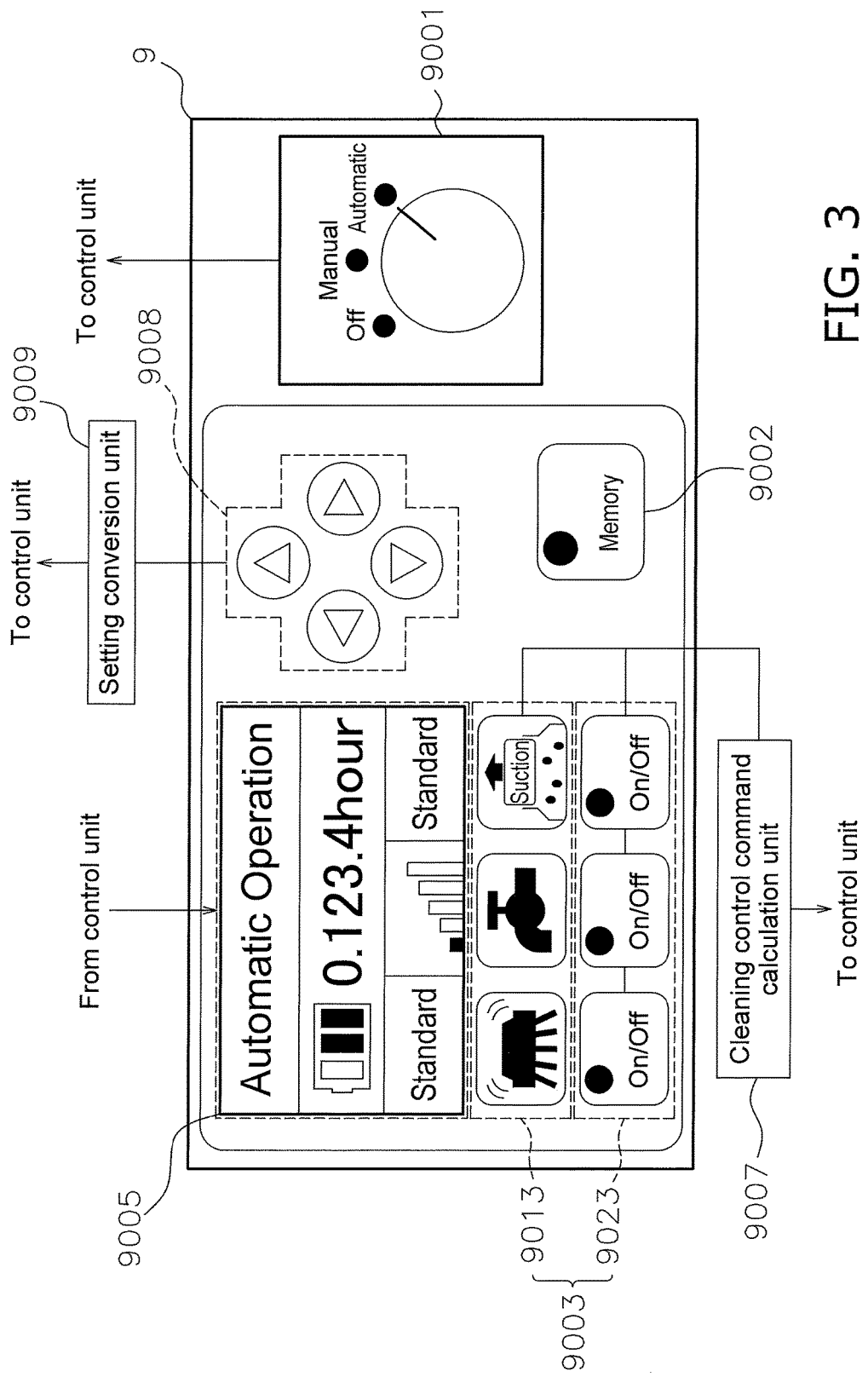
FIG. 3 is a diagram illustrating a structure of a setting unit.

Next, a structure of the setting unit 9 is described with reference to FIG. 3. FIG. 3 is a diagram illustrating a structure of the setting unit 9. The setting unit 9 includes a switching unit 9001, a manual operation storing switch 9002, a cleaning condition teaching unit 9003, a display unit 9005, a cleaning control command calculation unit 9007, a setting operation unit 9008, and a setting conversion unit 9009.

The switching unit 9001 is electrically connected to the control unit 5. The switching unit 9001 selects an operation mode of the autonomously traveling floor washer 100. The switching unit 9001 preferably includes a switch or the like, for example, and selects an operation mode by switching the switch.

Operation modes of the autonomously traveling floor washer 100 include an autonomous cleaning mode and a manual operation mode. The autonomous cleaning mode is an operation mode in which the autonomously traveling floor washer 100 autonomously travels and washes the floor surface F without necessity of an operator's operation. The operation mode is set to the autonomous cleaning mode by setting the switching unit 9001 to "automatic" illustrated in FIG. 3.

On the other hand, the manual operation mode is an operation mode in which the autonomously traveling floor washer 100 is able to be manually operated by an operator. The operation mode is set to the manual operation mode by setting the switching unit 9001 to "manual" illustrated in FIG. 3.

The manual operation storing switch 9002 is electrically connected to the control unit 5. The manual operation storing switch 9002 is a switch that starts storing an operator's manual operation of the autonomously traveling floor washer 100. In other words, when the manual operation storing switch 9002 is pressed after the operation mode is set to the manual operation mode by the switching unit 9001, teaching of a cleaning condition of the cleaning work performed by the operator's manual operation and a travel route by the operator's moving operation to the autonomously traveling floor washer 100 is started.

Accordingly, the operation modes of the autonomously traveling floor washer 100 include, in addition to the autonomous cleaning mode and the manual operation mode, a manual operation teaching mode as a sub operation mode of the manual operation mode. The manual operation teaching mode is an operation mode to teach a cleaning condition and a travel route of the autonomously traveling floor washer 100 by the operator's manual operation to the autonomously traveling floor washer 100. Further, when the manual operation storing switch 9002 is pressed, the operation mode is changed from the manual operation mode to the manual operation teaching mode.

In addition, as described later, when the manual operation storing switch 9002 is pressed (again) in the state where the operation mode is set to the manual operation teaching mode, teaching of the operator's manual operation is terminated. Thus, the operator is able to terminate the teaching of the manual operation at a desired position by pressing the manual operation storing switch 9002 at the desired position. As a result, the autonomously traveling floor washer 100 is able to generate a cleaning schedule 500 desired by the operator.

When the manual operation storing switch 9002 is pressed during execution of the manual operation teaching mode, the operation mode may be changed from the manual operation teaching mode to the manual operation mode. In this case, the operator is able to continue the manual operation of the autonomously traveling floor washer 100 even after changing the manual operation teaching mode to the manual operation mode.

The cleaning condition teaching unit 9003 realizes a function of accepting an input of the cleaning condition by the operator and outputting the cleaning condition to the cleaning unit 3. The cleaning condition teaching unit 9003 is connected to the control unit 5 via the cleaning control command calculation unit 9007. Thus, the cleaning condition (taught cleaning condition) set in the cleaning condition teaching unit 9003 is converted by the cleaning control command calculation unit 9007 into a signal that is understandable by the control unit 5, and the signal is transmitted to the control unit 5.

In addition, the cleaning condition teaching unit 9003 includes a cleaning condition adjusting unit 9013 and an operation switching unit 9023. The cleaning condition adjusting unit 9013 sets individually as the taught cleaning condition the washing power W of the washing member 3001 on the floor surface F, the washing liquid supply amount S supplied from the washing liquid supplying unit 3003, and the suction power P of the sucking unit 3005. The cleaning condition adjusting unit 9013 includes a push switch, for example, and the taught cleaning condition described above can be set in accordance with the number of pressing the push switch.

The operation switching unit 9023 controls operation and stop of the washing member 3001 (floor surface washing unit), the washing liquid supplying unit 3003, and the sucking unit 3005. The operation switching unit 9023 includes a push switch, for example, and is able to switch between operation and stop of the washing member 3001 (floor surface washing unit), the washing liquid supplying unit 3003, and the sucking unit 3005 by pressing the push switch.

The display unit 9005 is connected to the control unit 5 so that signals are able to be communicated. The display unit 9005 receives from the control unit 5 the cleaning condition and the like set in the control unit 5, and displays the received cleaning condition and the like. The display unit 9005 displays as the cleaning condition the washing power W of the washing member 3001 on the floor surface F, the washing liquid supply amount S supplied from the washing liquid supplying unit 3003, and the suction power P of the sucking unit 3005. Thus, since the display unit 9005 displays the cleaning condition and the like, the operator is able to perform the cleaning work while checking the displayed cleaning condition.

Besides, the display unit 9005 displays a current operation mode (the autonomous cleaning mode, the manual operation mode, or the manual operation teaching mode), an operation period, and the like. Further, the display unit 9005 displays various setting procedures when performing various settings of the autonomously traveling floor washer 100 with the setting operation unit 9008.

The setting operation unit 9008 is connected to the control unit 5 via the setting conversion unit 9009. Accordingly, the various settings set by the setting operation unit 9008 are converted by the setting conversion unit 9009 into a signal that is understandable by the control unit 5, and the signal is transmitted to the control unit 5.

The setting operation unit 9008 performs various settings of the autonomously traveling floor washer 100 and transmits the various settings to the control unit 5. The setting operation unit 9008 includes a push switch or the like, for example. Accordingly, the operator is able to perform various settings of the autonomously traveling floor washer 100 by operating the setting operation unit 9008 while checking the setting procedure of the various settings displayed on the display unit 9005.

(5) Structure of Control Unit 5-1. Overall Structure of Control Unit

Figure 4:
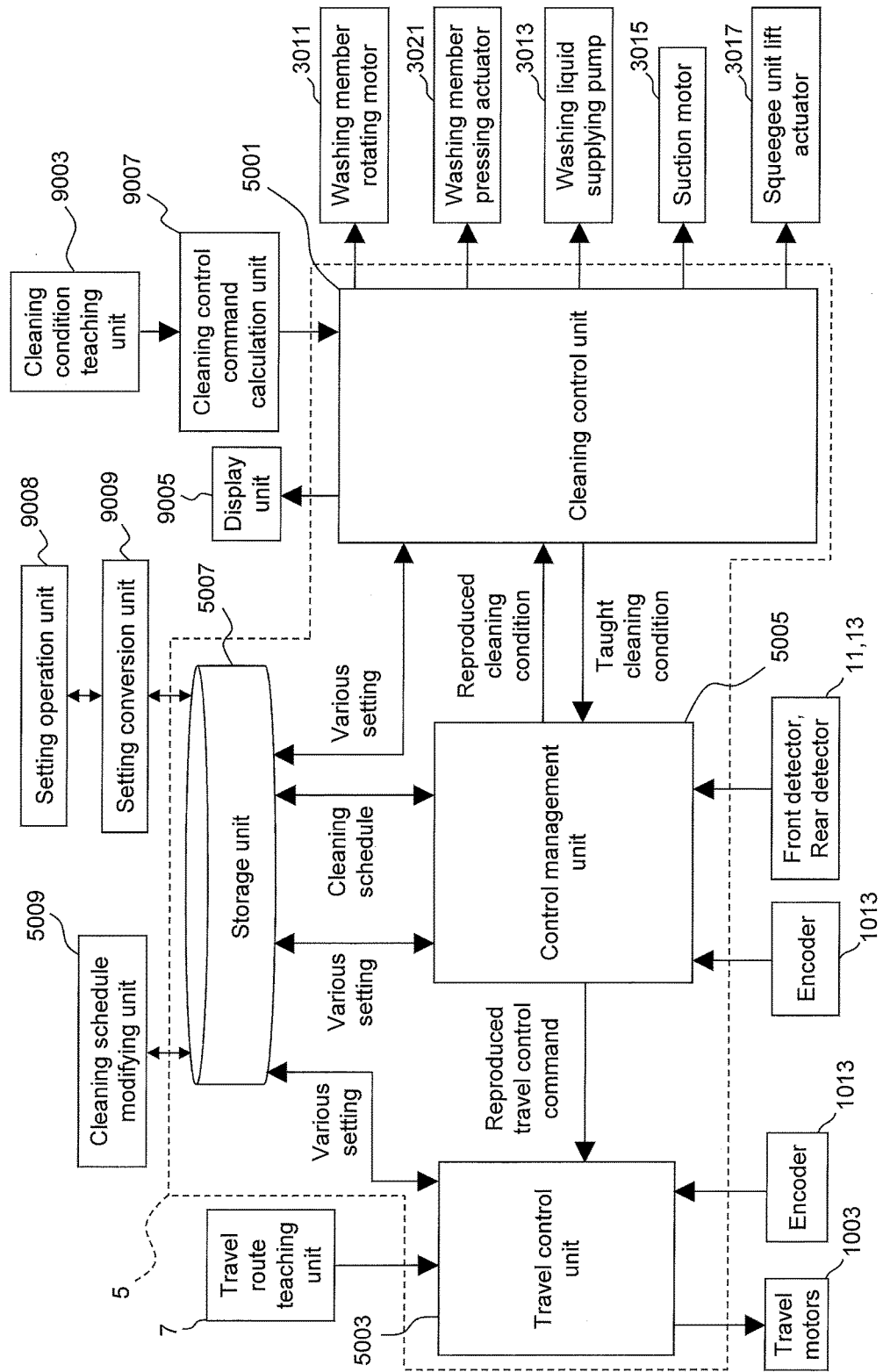
FIG. 4 is a diagram illustrating an overall structure of a control unit.

Next, an overall structure of the control unit 5 is described with reference to FIG. 4. FIG. 4 is a diagram illustrating an overall structure of the control unit 5. In this preferred embodiment, the control unit 5 is a microcomputer system including a central processing unit (CPU), a memory unit such as a random access memory (RAM) and a read only memory (ROM), a storage device, various interfaces, and the like. A whole or a portion of the control unit 5 described below may be realized by a program that can be executed by the microcomputer system. In this case, the program may be stored in the memory unit and/or the storage device, such as a non-transitory computer readable medium. In addition, a whole or a portion of portions of the control unit 5 may be realized by a custom IC.

The control unit 5 mainly includes a cleaning control unit 5001, a travel control unit 5003, a control management unit 5005, and a storage unit 5007.

The cleaning control unit 5001 is electrically connected to the washing member rotating motor 3011, the washing liquid supplying pump 3013, and the suction motor 3015. Thus, the cleaning control unit 5001 is able to supply the washing member rotating motor 3011, the washing liquid supplying pump 3013, and the suction motor 3015 with powers (cleaning unit controlling amounts) to control the rotation speed and the output power of the motor and the pump. In addition, the cleaning control unit 5001 is electrically connected to the washing member pressing actuator 3021 and the squeegee unit lift actuator 3017. Thus, the cleaning control unit 5001 is able to supply the washing member pressing actuator 3021 and the squeegee unit lift actuator 3017 with powers (cleaning unit controlling amounts) to control operation amounts of the actuators.

In addition, the cleaning control unit 5001 is connected to the cleaning condition teaching unit 9003 via the cleaning control command calculation unit 9007 so that signals are communicated. Thus, the cleaning control unit 5001 is able to input the taught cleaning condition set in the cleaning condition teaching unit 9003. The cleaning control unit 5001 is also able to control the cleaning unit 3 based on the taught cleaning condition. Further, the cleaning control unit 5001 is connected to the display unit 9005. Thus, the cleaning control unit 5001 is able to output the cleaning condition and the like to the display unit 9005.

The cleaning control unit 5001 is connected to the control management unit 5005 so that signals are able to be communicated. Accordingly, the cleaning control unit 5001 is able to input the reproduced cleaning condition (described later). The cleaning control unit 5001 is able to control the cleaning unit 3 based on the reproduced cleaning condition. Note that details of the cleaning control unit 5001 will be described later.

The travel control unit 5003 is connected to the encoder 1013 connected to the output rotation shaft of the travel motors 1003, so that signals are able to be communicated. Thus, the travel control unit 5003 is able to input a pulse signal output from the encoder 1013. In addition, the travel control unit 5003 is electrically connected to the travel motors 1003. Thus, the travel control unit 5003 is able to output to the travel motors 1003 the power to control the travel motors 1003 based on the pulse signal output from the encoder 1013.

Further, the travel control unit 5003 is connected to the travel route teaching unit 7 and the control management unit 5005, so that signals are able to be communicated. Accordingly, the travel control unit 5003 is able to output to the travel motors 1003 the power to control the travel motors 1003 based on the travel control command based on the rotation amounts and the rotation directions of the handles 7001a and 7001b of the travel route teaching unit 7 or based on the reproduced travel control command. Note that details of the travel control unit 5003 will be described later.

The control management unit 5005 is connected to the front detector 11, the rear detector 13, and the encoder 1013 of the travel motors 1003, so that signals are able to be communicated. Accordingly, the control management unit 5005 is able to estimate position data of the autonomously traveling floor washer 100 based on the information regarding the front obstacle obtained from the front detector 11, the information regarding the rear obstacle obtained from the rear detector 13, and the rotation amounts of the travel motors 1003 obtained from the encoder 1013. Note that a method of estimating the position data in the control management unit 5005 will be described later.

The control management unit 5005 is connected to the cleaning control unit 5001 so that signals are able to be communicated. Accordingly, the control management unit 5005 is able to receive the cleaning condition as the taught cleaning condition from the cleaning control unit 5001 when the manual operation teaching mode is executed. In addition, when the autonomous cleaning mode is executed, the control management unit 5005 is able to output the reproduced cleaning condition to the cleaning control unit 5001. The reproduced cleaning condition is a cleaning condition that determines controlling amounts of the motor, the pump, and the actuator of the cleaning unit 3 when the autonomous cleaning mode is executed. The reproduced cleaning condition is calculated by the control management unit 5005 based on the taught data obtaining time (described later) and the taught cleaning condition (described later) stored in the cleaning schedule 500 (described later and see FIGS. 17A and 17B). A method of calculating the reproduced cleaning condition by the control management unit 5005 will be described later.

Further, the control management unit 5005 is connected to the travel control unit 5003 so that signals are able to be communicated. Accordingly, the control management unit 5005 is able to transmit the reproduced travel control command when the autonomous cleaning mode is executed. The reproduced travel control command is a command that determines controlling amounts of the travel motors 1003 when the autonomous cleaning mode is executed. The reproduced travel control command is calculated by the control management unit 5005 based on the taught data obtaining time and the taught position data (described later) stored in the cleaning schedule 500. A method of calculating the reproduced travel control command by the control management unit 5005 will be described later.

The storage unit 5007 is connected to the control management unit 5005 so that signals are able to be communicated. In the case where the control unit 5 is the microcomputer system, the storage unit 5007 corresponds to a portion or a whole of the storing area of a RAM, a ROM, and/or the storage device. Accordingly, the storage unit 5007 is able to store the cleaning schedule 500 generated in the control management unit 5005. In addition, the control management unit 5005 is able to read the cleaning schedule 500 stored in the storage unit 5007 as necessary.

Note that the control unit 5 may include a data writing device (not illustrated) to store the cleaning schedule 500 stored in the storage unit 5007 in another storage medium. Alternatively, the control unit 5 may include a connection terminal such as a Universal Serial Bus (USB) port, which is able to be connected to the data writing device. Thus, the control unit 5 is able to store the cleaning schedule 500 stored in the storage unit 5007 in other storage medium.

The storage unit 5007 is connected to the setting operation unit 9008 via the setting conversion unit 9009 of the setting unit 9 so that signals are able to be communicated. Thus, the storage unit 5007 is able to store various settings set by the setting operation unit 9008. In addition, the setting operation unit 9008 is able to read the various settings stored in the storage unit 5007 as necessary. Further, the various settings stored in the storage unit 5007 is able to be read by the cleaning control unit 5001, the travel control unit 5003, and the control management unit 5005.

In this preferred embodiment, the control unit 5 further includes a cleaning schedule modifying unit 5009. The cleaning schedule modifying unit 5009 modifies the taught cleaning condition, the taught position data, and the taught data obtaining time stored in the cleaning schedule 500. Thus, after teaching the cleaning schedule 500, modification or the like of the cleaning schedule 500 is able to be performed.

Note that the cleaning schedule modifying unit 5009 may not be provided integrally with the autonomously traveling floor washer 100. For instance, the cleaning schedule modifying unit 5009 may be provided to an information terminal or the like. In this case, the information terminal or the like equipped with the cleaning schedule modifying unit 5009 communicates with the autonomously traveling floor washer 100, for example, so as to transmit and receive the cleaning schedule 500 stored in the storage unit 5007.

5-2. Structure of Cleaning Control Unit

Figure 5:
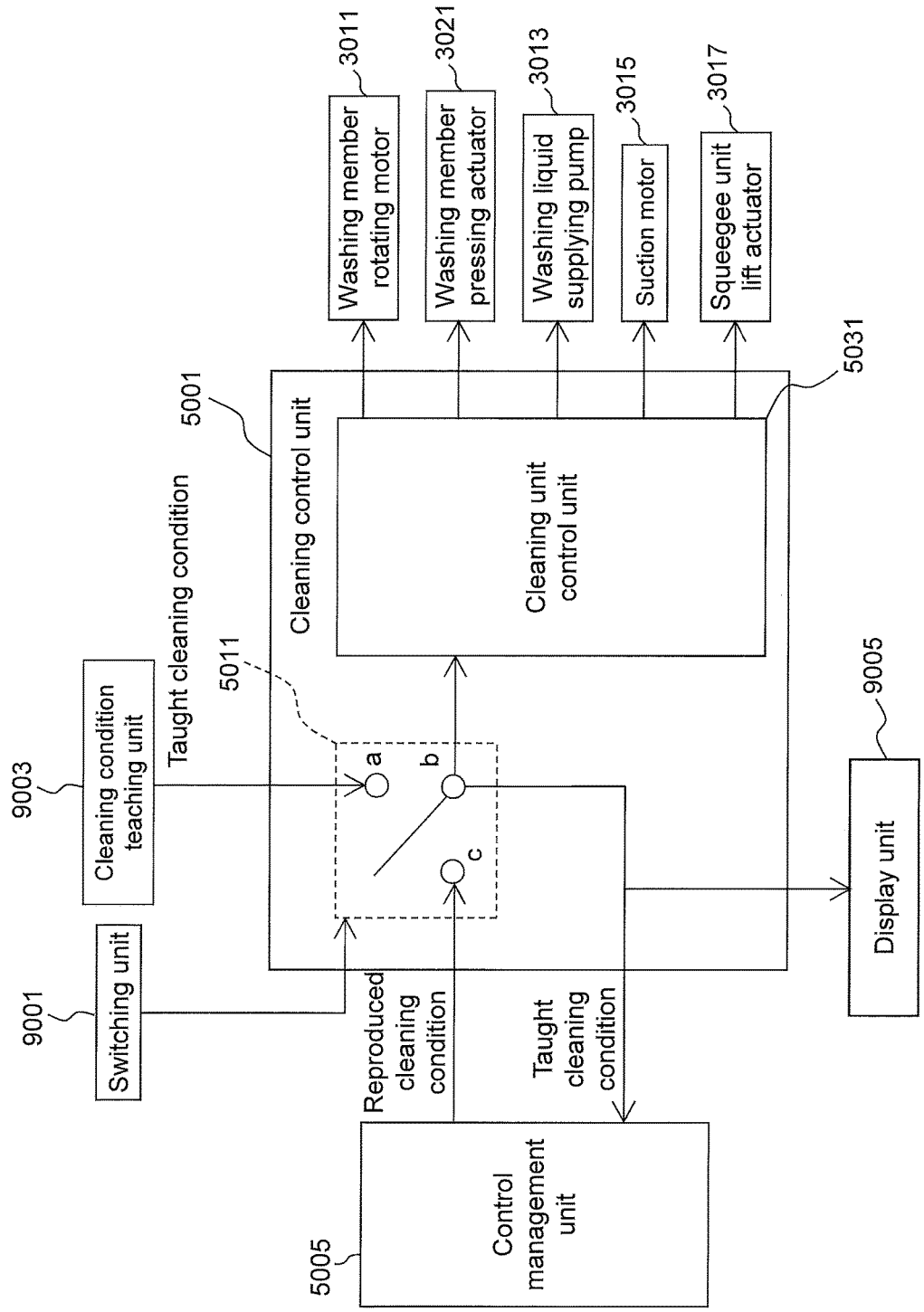
FIG. 5 is a diagram illustrating a structure of a cleaning control unit.

Next, a structure of the cleaning control unit 5001 is described with reference to FIG. 5. FIG. 5 is a diagram illustrating a structure of the cleaning control unit 5001. The cleaning control unit 5001 includes a cleaning switching unit 5011 and a cleaning unit control unit 5031.

The cleaning switching unit 5011 preferably includes three terminals a, b, and c. In addition, the cleaning switching unit 5011 is connected to the switching unit 9001 so that signals are able to be communicated. Accordingly, the cleaning switching unit 5011 is able to select whether to connect the terminal b with the terminal a or to connect the terminal b with the terminal c based on a signal from the switching unit 9001.

The terminal a is connected to the cleaning condition teaching unit 9003. The terminal b is connected to the cleaning unit control unit 5031 (described later), the display unit 9005, and the control management unit 5005. The terminal c is connected to the control management unit 5005.

Thus, when the switching unit 9001 selects the manual operation mode (including the case where the manual operation storing switch 9002 is pressed so that the operation mode changes to the manual operation teaching mode), the cleaning switching unit 5011 connects the terminal a with the terminal b. Further, the cleaning switching unit 5011 connects the cleaning condition teaching unit 9003 to the cleaning unit control unit 5031, the control management unit 5005, and the display unit 9005. As a result, when the manual operation mode or the manual operation teaching mode is executed, the cleaning switching unit 5011 is able to transmit the taught cleaning condition set by the cleaning condition teaching unit 9003 to the cleaning unit control unit 5031, the display unit 9005, and the control management unit 5005.

On the other hand, when the switching unit 9001 selects the autonomous cleaning mode, the terminal b is connected to the terminal c. Further, the cleaning switching unit 5011 connects the control management unit 5005 to the cleaning unit control unit 5031 and the display unit 9005. As a result, when the autonomous cleaning mode is executed, the cleaning switching unit 5011 is able to transmit the reproduced cleaning condition output from the control management unit 5005 to the cleaning unit control unit 5031 and the display unit 9005.

The cleaning unit control unit 5031 is connected to the terminal b of the cleaning switching unit 5011. As a result, the cleaning unit control unit 5031 is able to receive the taught cleaning condition or the reproduced cleaning condition via the cleaning switching unit 5011.

In addition, the cleaning unit control unit 5031 is electrically connected to the washing member rotating motor 3011, the washing member pressing actuator 3021, the washing liquid supplying pump 3013, the suction motor 3015, and the squeegee unit lift actuator 3017. Accordingly, the cleaning unit control unit 5031 is able to supply drive power to the above motor, the above pump, and the above actuator.

The cleaning unit control unit 5031 controls the drive power supplied to the motor, the pump, and the actuator based on the received taught cleaning condition or the reproduced cleaning condition.

For instance, in this preferred embodiment, based on the washing power on the floor surface F as the cleaning condition, the rotation speed of the washing member rotating motor 3011 and the pressing force of the washing member pressing actuator 3021 are controlled. In addition, based on the washing liquid supply amount S as the cleaning condition, a washing liquid flow amount of the washing liquid supplying pump 3013 is controlled. Further, based on the suction power P as the cleaning condition, the rotation speed (and/or the output power) of the suction motor 3015 is controlled.

5-3. Structure of Travel Control Unit

Figure 6:
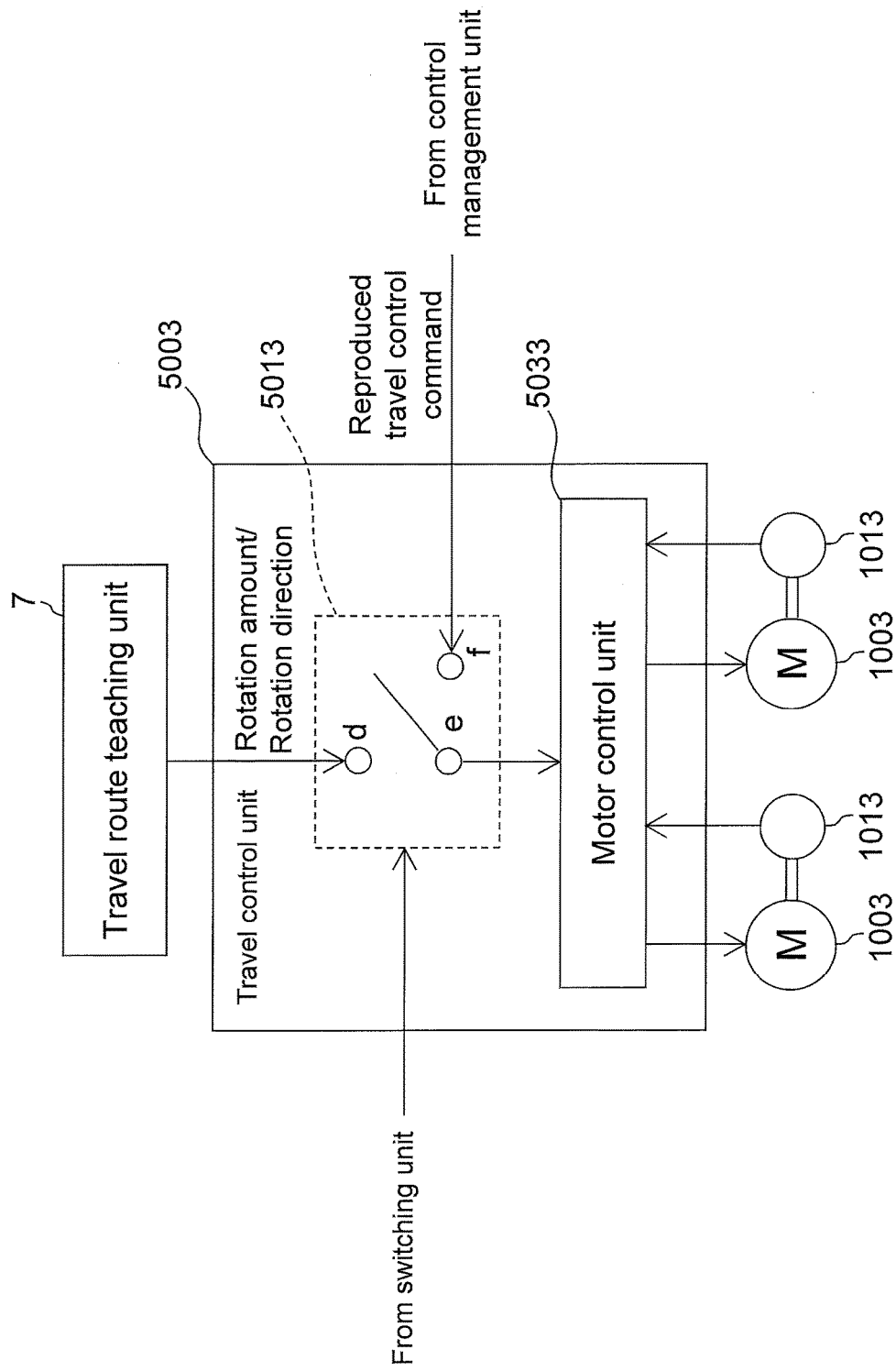
FIG. 6 is a diagram illustrating a structure of a travel control unit.

Next, a structure of the travel control unit 5003 is described with reference to FIG. 6. FIG. 6 is a diagram illustrating a structure of the travel control unit 5003. The travel control unit 5003 includes a travel switching unit 5013 and a motor control unit 5033.

The travel switching unit 5013 preferably includes three terminals d, e, and f. In addition, the travel switching unit 5013 is connected to the switching unit 9001 so that signals are able to be communicated. Accordingly, the travel switching unit 5013 is able to select whether to connect the terminal e with the terminal d or to connect the terminal e with the terminal f based on a signal from the switching unit 9001.

The terminal d is connected to the travel route teaching unit 7. The terminal e is connected to the motor control unit 5033 (described later). Further, the terminal f is connected to the control management unit 5005.

Thus, when the switching unit 9001 selects the manual operation mode (including the case where the manual operation storing switch 9002 is pressed so that the operation mode is changed to the manual operation teaching mode), the travel switching unit 5013 connects the terminal d with the terminal e. Further, the travel switching unit 5013 connects the travel route teaching unit 7 with the motor control unit 5033. As a result, when the manual operation mode or the manual operation teaching mode is executed, the travel switching unit 5013 is able to transmit to the motor control unit 5033 the travel control command calculated based on the rotation amounts and the rotation directions of the handles 7001a and 7001b of the travel route teaching unit 7.

On the other hand, when the switching unit 9001 selects the autonomous cleaning mode, the terminal e is connected with the terminal f. Further, the travel switching unit 5013 connects the control management unit 5005 with the motor control unit 5033. As a result, when the autonomous cleaning mode is executed, the travel switching unit 5013 is able to transmit to the motor control unit 5033 the reproduced travel control command output from the control management unit 5005.

The motor control unit 5033 is connected to the terminal e of the travel switching unit 5013. As a result, the motor control unit 5033 is able to receive the travel control command calculated based on the rotation amounts or the rotation directions of the handles 7001a and 7001b or the reproduced travel control command, via the travel switching unit 5013.

In addition, the motor control unit 5033 is electrically connected to the travel motors 1003. Thus, the motor control unit 5033 is able to output drive power to the travel motors 1003.

In addition, the motor control unit 5033 is connected to the encoder 1013 so that signals are able to be communicated. Accordingly, the motor control unit 5033 is able to control the rotation speed and the like of the travel motors 1003 based on the rotation amounts and the rotation directions of the handles 7001a and 7001b, or the reproduced travel control command, and the pulse signal from the encoder 1013. The information obtained based on the pulse signal from the encoder 1013 is information regarding rotation of the travel motors 1003 such as rotation amounts. Accordingly, the motor control unit 5033 controls the travel motors 1003 while feeding back the rotation amounts of the travel motors 1003.

Accordingly, as the motor control unit 5033, it is possible to use a motor control device using a proportional-integral (PI) control theory, a proportional-integral-differential (PID) control theory, or the like.

As described above, in this preferred embodiment, the travel motors 1003 are disposed on the left and right ends on the bottom portion of the traveling unit 1. In such a case, the motor control unit 5033 controls the rotation speed and the rotation direction of each of the two travel motors 1003 independently so as to determine the travel direction of the traveling unit 1.

5-4. Structure of Control Management Unit

Figure 7:
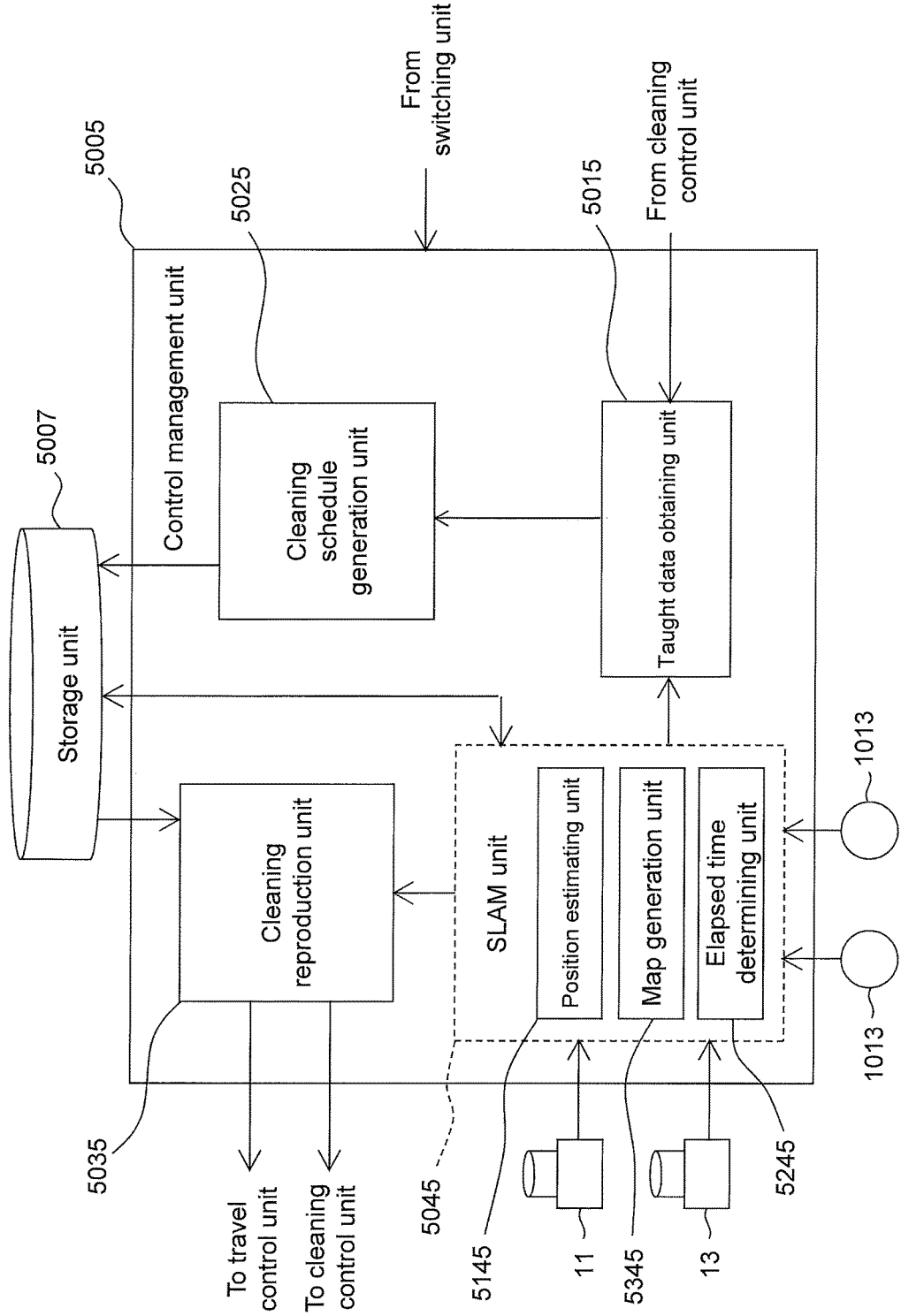
FIG. 7 is a diagram illustrating a structure of a control management unit.

Next, a structure of the control management unit 5005 is described with reference to FIG. 7. FIG. 7 is a diagram illustrating a structure of the control management unit 5005. The control management unit 5005 includes a taught data obtaining unit 5015, a cleaning schedule generation unit 5025, a cleaning reproduction unit 5035, and a SLAM unit 5045.

The taught data obtaining unit 5015 is able to realize a function of obtaining the taught position data and the taught cleaning condition at the taught data obtaining time when the manual operation teaching mode is executed. Specifically, the taught data obtaining unit 5015 is connected to the cleaning control unit 5001 so that signals are able to be communicated. Thus, the taught data obtaining unit 5015 is able to input the taught cleaning condition from the cleaning control unit 5001. In addition, the taught data obtaining unit 5015 is connected to the SLAM unit 5045 so that signals are able to be communicated. Thus, the taught data obtaining unit 5015 is able to input the taught data obtaining time and the taught position data from the SLAM unit 5045. In addition, the taught data obtaining time may be obtained directly from a system clock. Further, the taught data obtaining unit 5015 is connected to the cleaning schedule generation unit 5025 so that signals are able to be communicated. Thus, the taught data obtaining unit 5015 is able to output to the cleaning schedule generation unit 5025 the taught cleaning condition, the taught position data, and the taught data obtaining time.

Accordingly, when the manual operation teaching mode is executed, the taught data obtaining unit 5015 is able to obtain the taught position data and the taught cleaning condition at the taught data obtaining time.

The cleaning schedule generation unit 5025 is able to realize a function of generating and storing the cleaning schedule 500 in which the taught position data and the taught cleaning condition are associated with the taught data obtaining time. Specifically, the cleaning schedule generation unit 5025 is connected to the storage unit 5007 so that signals are able to be communicated. The cleaning schedule generation unit 5025 generates the cleaning schedule 500 in which the taught position data and the taught cleaning condition input from the taught data obtaining unit 5015 are associated with the taught data obtaining time. Further, the cleaning schedule generation unit 5025 stores the generated cleaning schedule 500 in the storage unit 5007.

Note that a data structure of the cleaning schedule 500 generated by the cleaning schedule generation unit 5025 will be described later.

The cleaning reproduction unit 5035 is connected to the SLAM unit 5045 so that signals are able to be communicated. Accordingly, the cleaning reproduction unit 5035 is able to input from the SLAM unit 5045 the elapsed time from start of execution of the autonomous cleaning mode. In addition, the cleaning reproduction unit 5035 is connected to the storage unit 5007 so that signals are able to be communicated. Accordingly, the cleaning reproduction unit 5035 is able to input the cleaning schedule 500 stored in the storage unit 5007.

As a result, when the autonomous cleaning mode is executed, the cleaning reproduction unit 5035 is able to calculate the reproduced cleaning condition and the reproduced travel control command at a predetermined elapsed time based on the taught data obtaining time, the taught cleaning condition, and the taught position data stored in the cleaning schedule 500. Note that a method of calculating the reproduced cleaning condition and the reproduced travel control command by the cleaning reproduction unit 5035 will be described later.

In addition, the cleaning reproduction unit 5035 is connected to the cleaning control unit 5001 and the travel control unit 5003 so that signals are able to be communicated. Accordingly, the cleaning reproduction unit 5035 is able to output the calculated reproduced cleaning condition and reproduced travel control command to the cleaning control unit 5001 and the travel control unit 5003, respectively.

The SLAM unit 5045 is connected to the front detector 11 and the rear detector 13 so that signals are able to be communicated. In addition, the SLAM unit 5045 is connected to the encoder 1013 so that signals are able to be communicated. Accordingly, the SLAM unit 5045 estimates information regarding a position (position data) of the autonomously traveling floor washer 100 in a predetermined coordinate system based on information regarding front and rear obstacles and the rotation amounts of the travel motors 1003.

The SLAM unit 5045 estimates the position data by a simultaneous localization and mapping (SLAM) method. The specific method of estimating the position data will be described later.

In addition, the SLAM unit 5045 is connected to the storage unit 5007. Accordingly, the SLAM unit 5045 is able to store map information in the storage unit 5007. In addition, the SLAM unit 5045 is able to refer to the map information and the cleaning schedule 500 stored in the storage unit 5007.

Further, the SLAM unit 5045 determines the taught data obtaining time and the elapsed time and is able to output them to the taught data obtaining unit 5015 and the cleaning reproduction unit 5035. Note that a method of determining the taught data obtaining time and the elapsed time by the SLAM unit 5045 will be described later.

A structure of the SLAM unit 5045 is described below.

5-5. Structure of SLAM Unit

Next, a structure of the SLAM unit 5045 is described with reference to FIG. 7. The SLAM unit 5045 includes a position estimating unit 5145, an elapsed time determining unit 5245, and a map generation unit 5345. The position estimating unit 5145 realizes a function of estimating position data. Specifically, the position estimating unit 5145 estimates information regarding position of the traveling unit 1 (the autonomously traveling floor washer 100) in the predetermined coordinate system, namely, the position data, based on the map information stored in the storage unit 5007, the rotation amounts of the travel motors 1003, and the local map information (described later). Note that a structure of the position data and a method of estimating the position data in the position estimating unit 5145 will be described later.

The elapsed time determining unit 5245 determines the taught data obtaining time and the elapsed time from start of execution of the autonomous cleaning mode. In this preferred embodiment, the elapsed time determining unit 5245 determines the taught data obtaining time by using a clock function of the microcomputer system of control unit 5, for example.

On the other hand, the elapsed time from start of execution of the autonomous cleaning mode is determined based on position data estimated by the position estimating unit 5145. Thus, by determining the elapsed time from start of execution of the autonomous cleaning mode based on the position estimation information, the autonomously traveling floor washer 100 is able to autonomously reproduce the cleaning work while accurately grasping timing and a place to execute the taught cleaning condition when the autonomous cleaning mode is executed.

Note that a method of determining the taught data obtaining time and the above elapsed time (predetermined elapsed time) by the elapsed time determining unit 5245 will be described later in detail.

The map generation unit 5345 generates map information to be used to determine the position data and the predetermined elapsed time, based on information regarding a front obstacle, information regarding a rear obstacle, and the rotation amounts of the travel motors 1003. The map information is used when the position estimating unit 5145 estimates the position data.

The map information generated by the map generation unit 5345 includes the following four pieces of information.

(i) First local map information, which is map information indicating a probability that an obstacle exists in a first area in a first coordinate system. Specifically, it is expressed by a value $P_k$ corresponding to a probability that an obstacle exists at coordinates $(X_k, Y_k)$ (k=1, 2, ... m, where m is an integer) in the first area. Accordingly, the first local map information can be expressed as three-dimensional values $(X_k, Y_k, P_k)$.

(ii) Second local map information, which is map information indicating a probability that an obstacle exists in a second area in a second coordinate system (corresponding to the predetermined coordinate system described above). The second local map information is obtained by converting the coordinates $(X_k, Y_k)$ in the first area of the first local map information to coordinates in the second coordinate system. Accordingly, the second local map information can be expressed as three-dimensional values $(x_k, y_k, P_k)$ (k=1, 2, ... m, where m is an integer).

(iii) Environment map information, which is map information regarding an obstacle in a predetermined area on the floor surface F to be cleaned, expressed in the second coordinate system. The environment map information is used to estimate position data. The environment map information is expressed by a value $p_i$ corresponding to a probability that an obstacle exists at coordinates $(x_i, y_i)$ (i=1, 2, ... j, where j is an integer) in a third area in the second coordinate system. Accordingly, the environment map information can be expressed as three-dimensional values $(x_i, y_i, p_i)$. Note that the third area expressing the environment map information and the second area expressing the second local map information may have the same size or different sizes.

(iv) Reproducing map information, which is map information to be used to reproduce the environment map information when the autonomous cleaning mode is executed. This map information is generated based on the first local map information or the second local map information when the manual operation teaching mode is executed. In addition, the reproducing map information is managed in association with time.

Note that a method of generating the each map information by the map generation unit 5345 will be described later in detail.

(6) Operation of Autonomously Traveling Floor Washer 6-1. Basic Operation

Figure 8A:
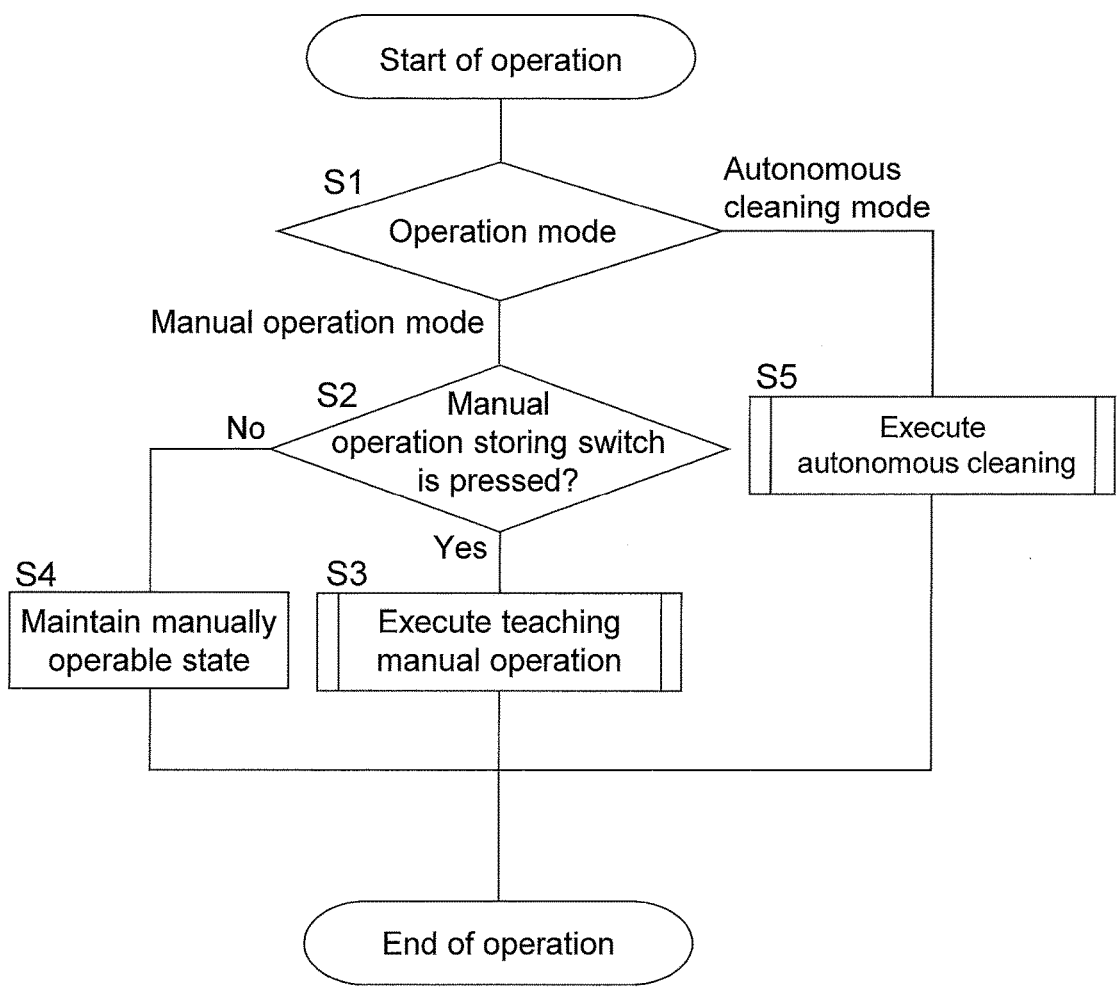
FIG. 8A is a flowchart illustrating a basic operation of the autonomously traveling floor washer.

Next, the operation of the autonomously traveling floor washer 100 is described. FIG. 8A is a flowchart illustrating a basic operation of the autonomously traveling floor washer 100.

First, when the autonomously traveling floor washer 100 starts its operation, the control unit 5 checks a state of the switching unit 9001 (Step S1). In other words, the control unit 5 checks whether the switching unit 9001 selects to be "manual" illustrated in FIG. 3 or "automatic" illustrated in FIG. 3.

If the switching unit 9001 selects "manual", the control unit 5 determines that the autonomously traveling floor washer 100 is able to be manually operated by the travel route teaching unit 7 and the cleaning condition teaching unit 9003 (namely, in a state where the operation mode is set to the manual operation mode). On the other hand, if the switching unit 9001 selects "automatic", the control unit 5 determines that the autonomous cleaning mode is to be executed.

If the switching unit 9001 selects that the manual operation mode is to be executed (If the "manual operation mode" is selected in Step S1), the process proceeds to Step S2. On the other hand, if the switching unit 9001 selects that the autonomous cleaning mode is to be executed (if the "autonomous cleaning mode" is selected in Step S1), the process proceeds to Step S5.

In Step S2, the control unit 5 checks whether or not the manual operation storing switch 9002 is pressed by the operator. If the control unit 5 determines that the manual operation storing switch 9002 is pressed ("Yes" in Step S2), the operation mode is changed from the manual operation mode to the manual operation teaching mode, and teaching of the manual operation starts (Step S3). Note that teaching of the manual operation in Step S3 will be described later.

On the other hand, if the control unit 5 determines that the manual operation storing switch 9002 is not pressed ("No" in Step S2), the control unit 5 maintains the operation mode to be the manual operation mode (Step S4). When the operation mode is maintained to be the manual operation mode, the autonomously traveling floor washer 100 is able to be manually operated by the operator, but the operator's manual operation is not stored in the autonomously traveling floor washer 100. In other words, as long as the manual operation storing switch 9002 is not pressed, the operator's manual operation is not taught.

By starting teaching of the manual operation when the manual operation storing switch 9002 is pressed, the operator is able to teach the manual operation to the autonomously traveling floor washer 100 from a desired travel position. As a result, the autonomously traveling floor washer 100 is able to generate the cleaning schedule 500 desired by the operator.

In Step S5, the cleaning reproduction unit 5035 calculates the reproduced travel control command and the reproduced cleaning condition as a control command to reproduce the taught cleaning work based on the cleaning schedule 500.

Thus, the cleaning control unit 5001 is controlled based on the calculated reproduced cleaning condition. Further, the travel control unit 5003 is controlled based on the calculated reproduced travel control command. As a result, the autonomously traveling floor washer 100 is able to autonomously reproduce the taught cleaning work.

A specific operation of Step S3 and Step S5 is described below.

6-2. A Method of Teaching Manual Operation

Figure 8B:
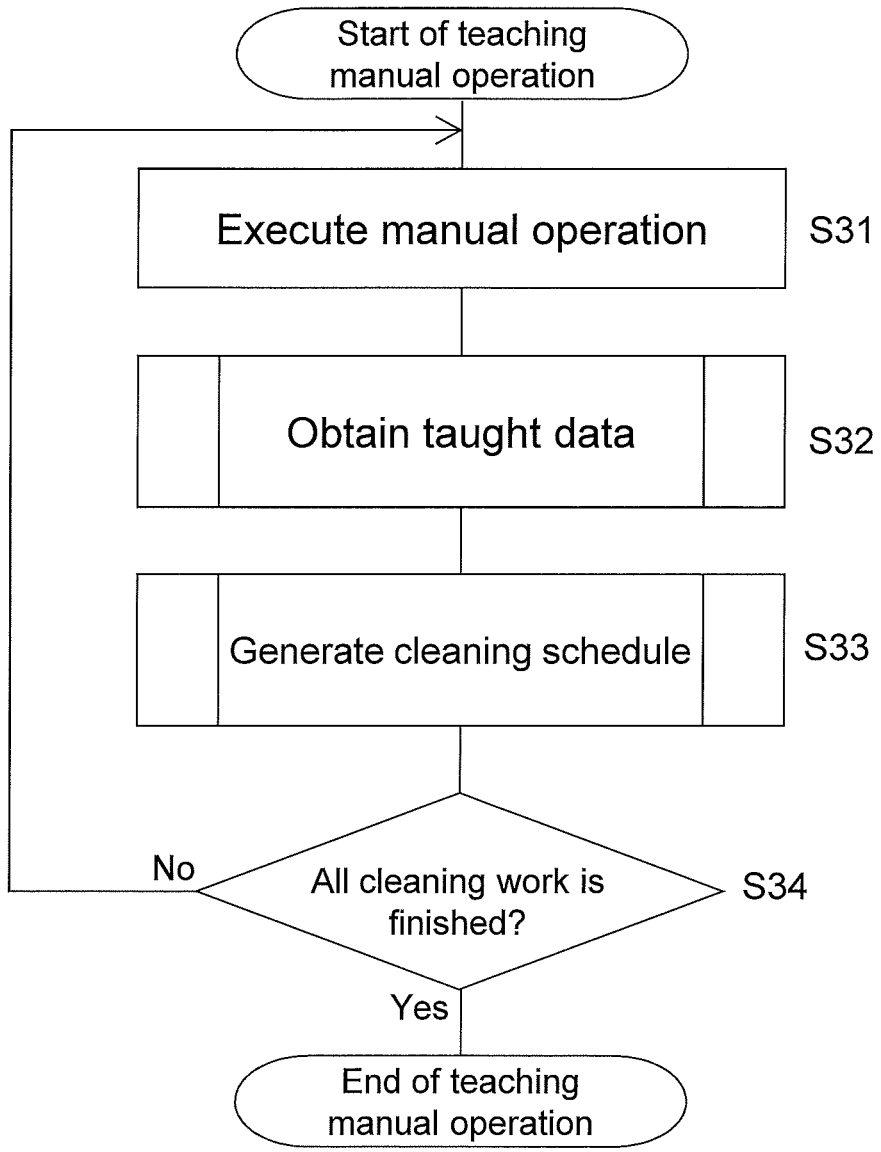
FIG. 8B is a flowchart illustrating a method of teaching a manual operation of the autonomously traveling floor washer by an operator.

First, a method of teaching the manual operation of the autonomously traveling floor washer 100 by the operator in Step S3 of FIG. 8A is described with reference to FIG. 8B. FIG. 8B is a flowchart illustrating a method of teaching the manual operation of the autonomously traveling floor washer by the operator.

After the operation mode is changed to the manual operation teaching mode (namely, after starting teaching the manual operation), the operator uses the travel route teaching unit 7 so as to manually travel the autonomously traveling floor washer 100. In addition, the operator uses the cleaning condition teaching unit 9003 so as to manually set the cleaning condition and to cause the autonomously traveling floor washer 100 to perform cleaning of the floor surface F (Step S31).

During the operator's manual operation, the taught data obtaining unit 5015 obtains the taught cleaning condition from the cleaning condition teaching unit 9003, and obtains the taught position data and the taught data obtaining time from the SLAM unit 5045, as the taught data (Step S32). Note that a method of obtaining the taught data in Step S32 will be described later in detail.

After obtaining the taught data in Step S32, the cleaning schedule generation unit 5025 generates the cleaning schedule 500 based on the taught cleaning condition, the taught position data, and the taught data obtaining time (Step S33). Note that a method of generating the cleaning schedule in Step S33 will be described later in detail.

After Step S33, the control unit 5 determines whether or not all the operator's manual operation (cleaning work) to be taught is finished (Step S34). It can be determined whether or not all the operator's cleaning work is finished when the manual operation teaching mode is executed, by checking whether or not the manual operation storing switch 9002 is pressed (again) during execution of the manual operation teaching mode. It may also be determined whether or not all the operator's cleaning work is finished based on a state of an operation stop execution/end button (not illustrated) of the setting unit 9. For instance, if this button is in an operation execution state, the control unit 5 determines that the cleaning work is continued. On the other hand, if this button is in an operation stop state, the control unit 5 determines that the cleaning work is finished.

If the control unit 5 determines that the cleaning work to be taught is continuing ("No" in Step S34), the process returns to Step S31. On the other hand, if the control unit 5 determines that all the cleaning work to be taught is finished ("Yes" in Step S35), teaching of the cleaning work by the operator is finished.

Thus, Steps S31 to S33 described above are continuously executed until the cleaning work by the operator is finished, so that the operator's cleaning work is taught to the autonomously traveling floor washer 100.

6-3. Method of Obtaining Taught Data

Figure 9:
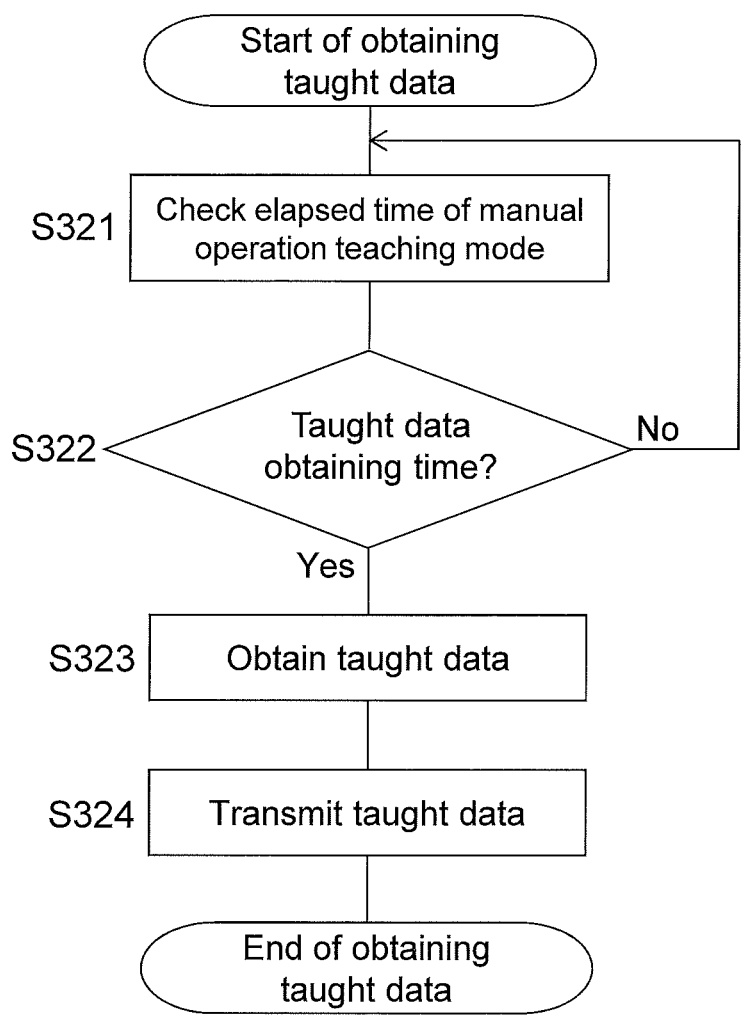
FIG. 9 is a flowchart illustrating a method of obtaining taught data.

Next, the method of obtaining the taught data in Step S32 is described with reference to FIG. 9. FIG. 9 is a flowchart illustrating a method of obtaining the taught data.

When starting obtaining the taught data, the taught data obtaining unit 5015 first checks the elapsed time from start of execution of the manual operation teaching mode (manual operation teaching mode elapsed time) (Step S321). Further, the taught data obtaining unit 5015 determines whether or not the manual operation teaching mode elapsed time is equal to the taught data obtaining time (Step S322). This determination is able to be realized as follows, for example.

First, the elapsed time determining unit 5245 generates a pulse signal (obtaining time determining pulse signal) every predetermined time by using a clock function of the microcomputer system or a microcomputer system clock. Next, the taught data obtaining unit 5015 detects (a rising edge or a falling edge of) the obtaining time determining pulse signal. When the obtaining time determining pulse signal is detected, the taught data obtaining unit 5015 determines that the manual operation teaching mode elapsed time has become equal to the taught data obtaining time.

When the taught data obtaining unit 5015 determines that the manual operation teaching mode elapsed time is not equal to the taught data obtaining time ("No" in Step S322), the process returns to Step S321.

On the other hand, when the taught data obtaining unit 5015 determines that the manual operation teaching mode elapsed time is equal to the taught data obtaining time ("Yes" in Step S322), the process proceeds to Step S323. Thus, the taught data obtaining unit 5015 is able to obtain the taught data at a time determined by the elapsed time determining unit 5245.

In Step S323, the taught data obtaining unit 5015 obtains the taught data. Specifically, the taught data obtaining unit 5015 obtains the taught position data and the taught data obtaining time from the SLAM unit 5045. In addition, the taught data obtaining unit 5015 obtains the taught cleaning condition from the cleaning condition teaching unit 9003 via the cleaning control unit 5001.

As described above, the elapsed time determining unit 5245 generates the obtaining time determining pulse signal every predetermined time by using the clock function or the clock of the microcomputer system. In this case, the taught data obtaining unit 5015 is able to obtain (calculate) the taught data obtaining time by multiplying a pulse interval of the obtaining time determining pulse signal by the number of generation of the obtaining time determining pulse signal, for example.

Alternatively, the elapsed time determining unit 5245 may determine not only the obtaining time determining pulse signal but also the taught data obtaining time so as to output them to the taught data obtaining unit 5015. In this case, the taught data obtaining unit 5015 does not have to calculate the taught data obtaining time.

In addition, the taught position data obtained in Step S323 is estimated (calculated) by the position estimating unit 5145 based on signals from the front detector 11, the rear detector 13, and the encoder 1013 at a timing generated by the obtaining time determining pulse signal. Then, the SLAM unit 5045 outputs the calculated taught position data.

Note that a method of estimating the taught position data by the position estimating unit 5145 will be described later.

On the other hand, as to the taught cleaning condition, the cleaning condition set by the cleaning condition teaching unit 9003 is obtained as the taught cleaning condition (S, W, P) via the cleaning switching unit 5011 when the taught data obtaining unit 5015 receives the obtaining time determining pulse signal. Further, Sin the taught cleaning condition represents the supply amount of the washing liquid supplied from the washing liquid supplying unit 3003. W represents the washing power of the washing member 3001. P represents the suction power of the sucking unit 3005.

After the taught data obtaining unit 5015 obtains the taught data obtaining time, the taught position data, and the taught cleaning condition as the taught data in Step S323, the process proceeds to Step S324.

In Step S324, the taught data obtaining unit 5015 transmits the obtained taught data to the cleaning schedule generation unit 5025.

In this way, the taught data obtaining unit 5015 obtains the taught cleaning condition, the taught position data, and the taught data obtaining time at the taught data obtaining time and is able to transmit them to the cleaning schedule generation unit 5025. Further, the taught data obtaining time is determined by the elapsed time determining unit 5245. In other words, the taught cleaning condition and the taught position data are autonomously obtained by the autonomously traveling floor washer 100. Thus, the operator of the autonomously traveling floor washer 100 is able to teach the cleaning work in the same manner as performing the cleaning work using a conventional self-propelled walking type floor surface washer or the like without any consideration of generating and storing the cleaning schedule 500.

As illustrated in FIG. 8B, Step S32 for obtaining the taught data is executed until all the cleaning work by the operator is finished. Accordingly, Steps S321 to S324 are also executed repeatedly until all the cleaning work by the operator is finished. Thus, the taught data obtaining unit 5015 is able to repeatedly obtain the taught data and transmit them to the cleaning schedule generation unit 5025 until all the cleaning work by the operator is finished.

6-3-1. Method of Estimating Position

Figure 10:
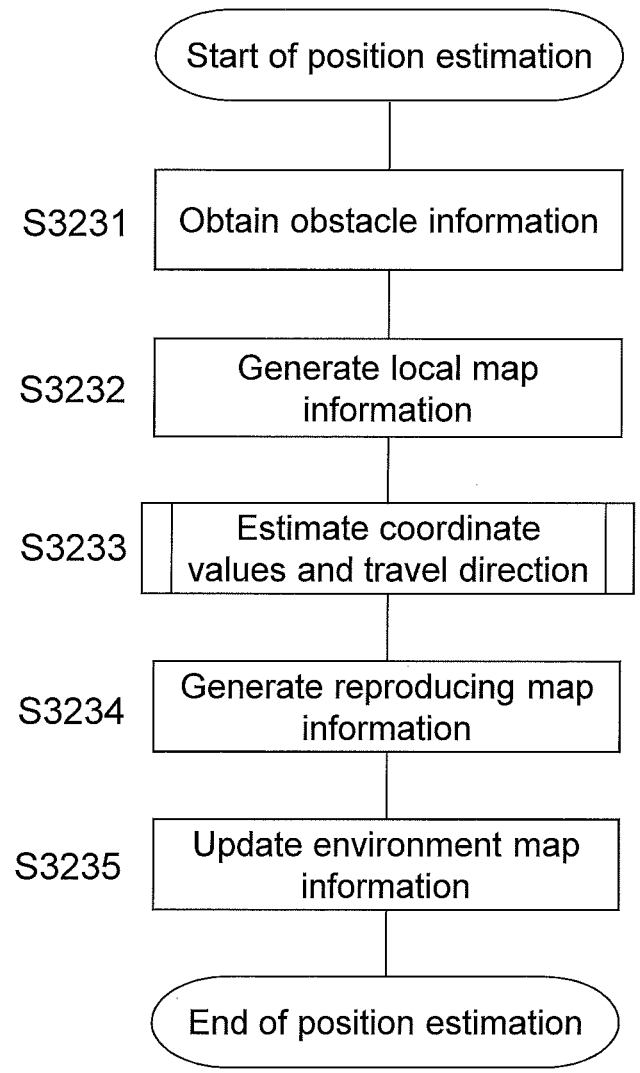
FIG. 10 is a flowchart illustrating a method of estimating position data.

Now, a method of estimating the position data by the SLAM unit 5045 is described with reference to FIG. 10. FIG. 10 is a flowchart illustrating a method of estimating (taught) position data. In the method of estimating position data described with reference to FIG. 10, the position data of the traveling unit 1 is estimated by using the travel amount of the traveling unit 1 calculated based on the pulse signal from the encoder 1013 and information (map information) regarding obstacles obtained from the front detector 11 and the rear detector 13.

In the following description, a method of estimating a position at a taught data obtaining time $T_n$ (n is an integer and indicates an n-th position estimation) is exemplified.

First, the SLAM unit 5045 obtains information regarding a front obstacle and information regarding a rear obstacle at the taught data obtaining time $T_n$ from the front detector 11 and the rear detector 13 (Step S3231).

After Step S3231, the process proceeds to Step S3232. In Step S3232, the map generation unit 5345 generates the first local map information based on the obtained information regarding the front obstacle and information regarding the rear obstacle. Note that a specific method of generating the first local map information will be described later.

After Step S3232, the process proceeds to Step S3233. In Step S3233, the SLAM unit 5045 calculates the rotation amounts of the travel motors 1003 during a period from taught data obtaining time $T_{n-1}$ to taught data obtaining time $T_n$ based on the pulse signal of the encoder 1013 (rotation amount determining pulse signal). Further, the position estimating unit 5145 estimates a position (coordinate values $(x_n, y_n)$) of the autonomously traveling floor washer 100 (traveling unit 1) in a predetermined coordinate system and a travel direction of the traveling unit 1 in the predetermined coordinate system based on the rotation amounts of the travel motors 1003, the environment map information at the taught data obtaining time $T_{n-1}$, and the local map information at the taught data obtaining time $T_n$.

Figure 11:
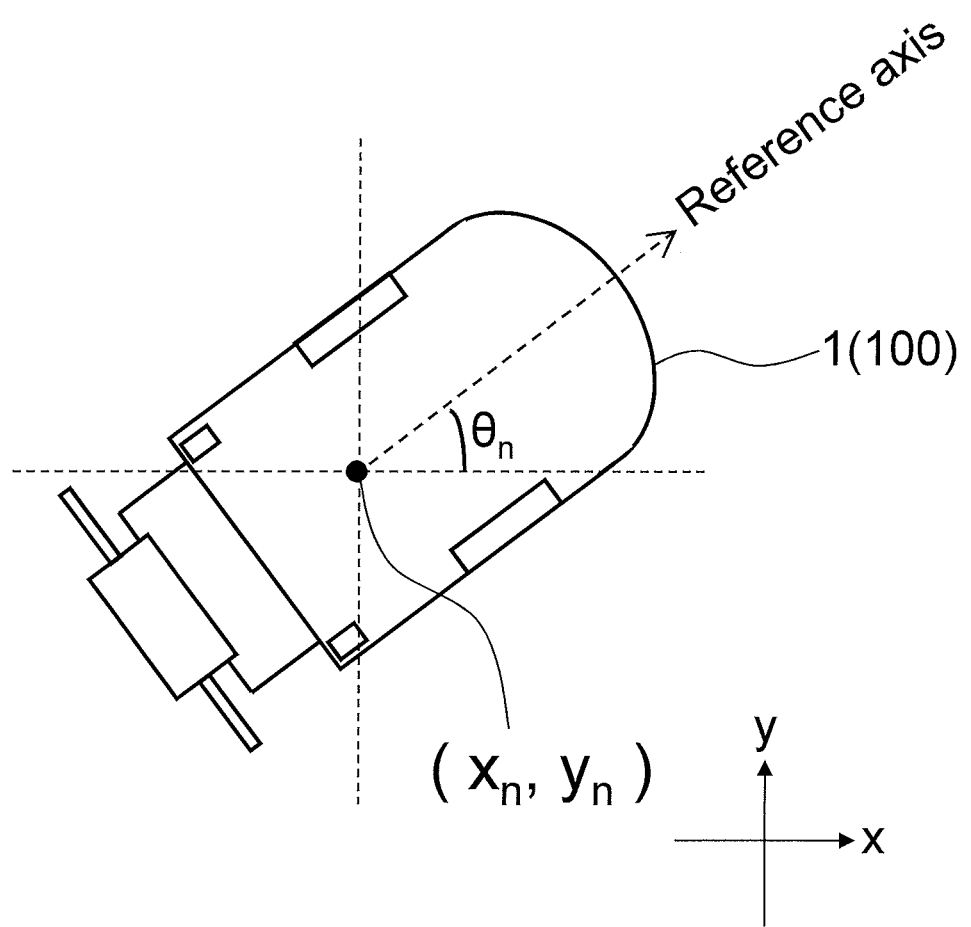
FIG. 11 is a diagram schematically illustrating position data.

Here, the travel direction of the traveling unit 1 in the second coordinate system (predetermined coordinate) at the taught data obtaining time $T_n$ is defined as an angle $\theta_n$ between a horizontal axis (x axis) of the second coordinate system and an axis parallel to the front direction of the traveling unit 1 (which may be referred to as a "reference axis") as illustrated in FIG. 11.

In other words, the position estimation information at the taught data obtaining time $T_n$ in this preferred embodiment includes three-dimensional values $(x_n, y_n, \theta_n)$ including coordinate values $(x_n, y_n)$ in the second coordinate system and the travel direction en of the traveling unit 1.

Note that a method of estimating the position and the travel direction of the traveling unit 1 in Step S3233 will be described later.

After Step S3233, the process proceeds to Step S3234.

In Step S3234, the map generation unit 5345 generates the second local map information from the first local map information obtained in Step S3232, and stores the generated second local map information as the reproducing map information in the storage unit 5007. In this case, the map generation unit 5345 associates the reproducing map information with the taught data obtaining time $T_n$ and stores it in the storage unit 5007.

In this way, by associating the reproducing map information with the taught data obtaining time $T_n$, information of an obstacle around the autonomously traveling floor washer 100 at the taught data obtaining time $T_n$ is able to be stored in the storage unit 5007.

Note that the second local map information is generated by converting the first coordinate system expressing the first local map information into the second coordinate system. Specifically, the first coordinate system is converted into the second coordinate system as follows.

First, the first local map information is rotated by $\theta_n$ in an opposite direction to the travel direction $\theta_n$ of the traveling unit 1 estimated in Step S3233. In other words, the first local map information is rotated by $-\theta_n$. Then, the first local map information after the rotation process is moved in parallel so that the origin of the first local map information after the rotation process becomes equal to the coordinate values $(x_n, y_n)$ of the traveling unit 1 estimated in Step S3233.

By this process, the first local map information $(X_k, Y_k, P_k)$ expressed in the first coordinate system is converted into the second local map information $(x_k, y_k, P_k) = (x_n + X_k \cos(-\theta_n) + Y_k \sin(-\theta_n), y_n - X_k \sin(-\theta_n) + Y_k \cos(-\theta_n), P_k)$ expressed in the second coordinate system.

Accordingly, the second local map information is generated by developing the first local map information expressed in the first coordinate system around the traveling unit 1 (autonomously traveling floor washer 100) into the second coordinate system expressing the plane for the cleaning work (floor surface F). Accordingly, by combining the plurality of generated second local map information, map information of a whole (or a portion) of the surface for the cleaning work (floor surface F) is generated.

After Step S3234, the process proceeds to Step S3235. In Step S3235, the map generation unit 5345 updates the environment map information. In Step S3235, the environment map information used for the next position data estimation (at the taught data obtaining time $T_{n+1}$) is generated. The generation of the environment map information in Step S3235 is performed, for example, by adding the second local map information of this time (at the taught data obtaining time $T_n$) to the environment map information generated in the last position estimation (at the taught data obtaining time $T_{n-1}$) (the environment map information used for the position estimation of this time). Further, the generated environment map information is stored in the storage unit 5007 in association with the taught data obtaining time $T_n$.

A portion of the environment map information generated in Step S3235, which is not necessary to estimate the next position data (at the taught data obtaining time $T_n$), may be deleted. In addition, the environment map information before the taught data obtaining time $T_n$ may be deleted from the storage unit 5007. In this way, a problem about a loop route in map generation by the SLAM method can be solved. In addition, a wasteful use of the storing area in the storage unit 5007 can be eliminated.

After the environment map information is updated in Step S3235, the position data estimation is finished.

In the method of estimating the position data described above, the position data $(x_0, y_0, \theta_0)$ at the taught data obtaining time $T_0$, namely, at the time when the manual operation teaching mode starts, is supposed to be (0, 0, 0). This means that the traveling unit 1 is at the origin (0, 0) in the predetermined coordinate system when the manual operation teaching mode starts, and the travel direction of the traveling unit 1 is 0 degree (in parallel to the x axis, namely, the reference axis of the traveling unit 1 when the manual operation teaching mode starts corresponds to the x axis of the predetermined coordinate).

Further, the update of the environment map information at the taught data obtaining time $T_0$ in Step S3235 is performed by regarding the first local map information obtained in Step S3232 as the environment map information.

6-3-2. Method of Generating First Local Map Information

Figure 12:
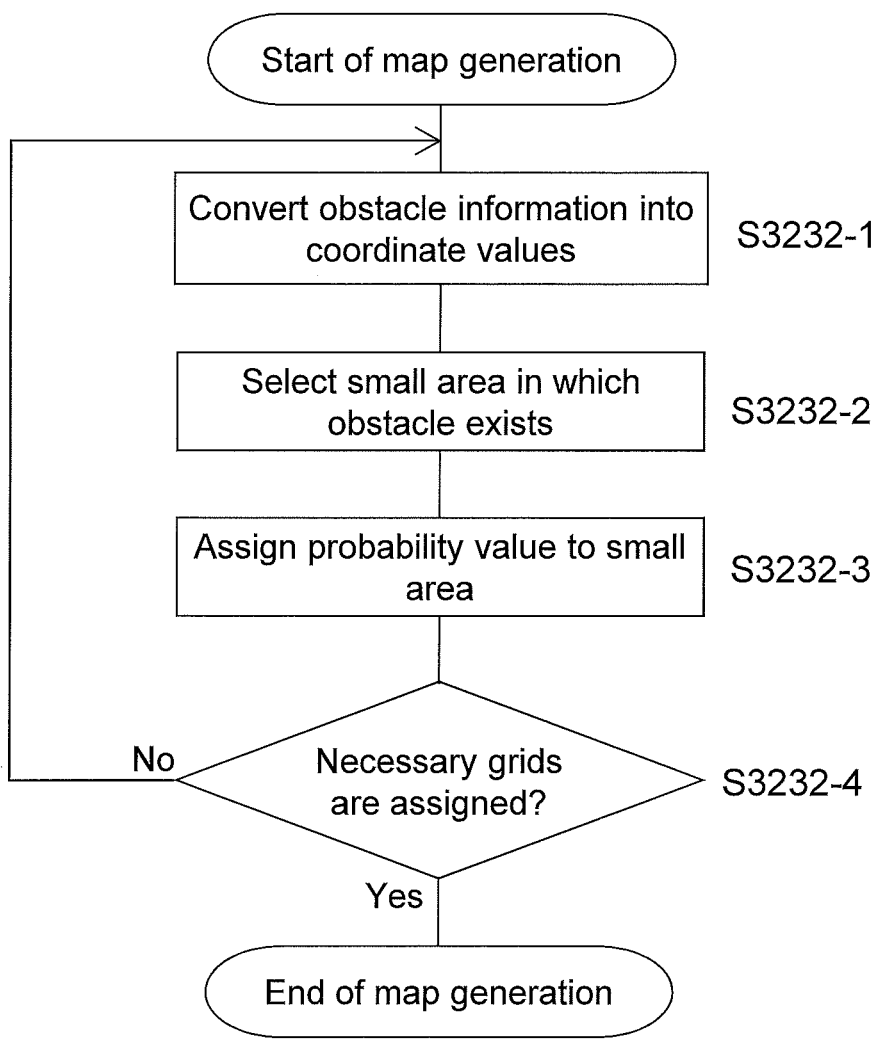
FIG. 12 is a flowchart illustrating a method of generating first local map information.
Figure 13A:
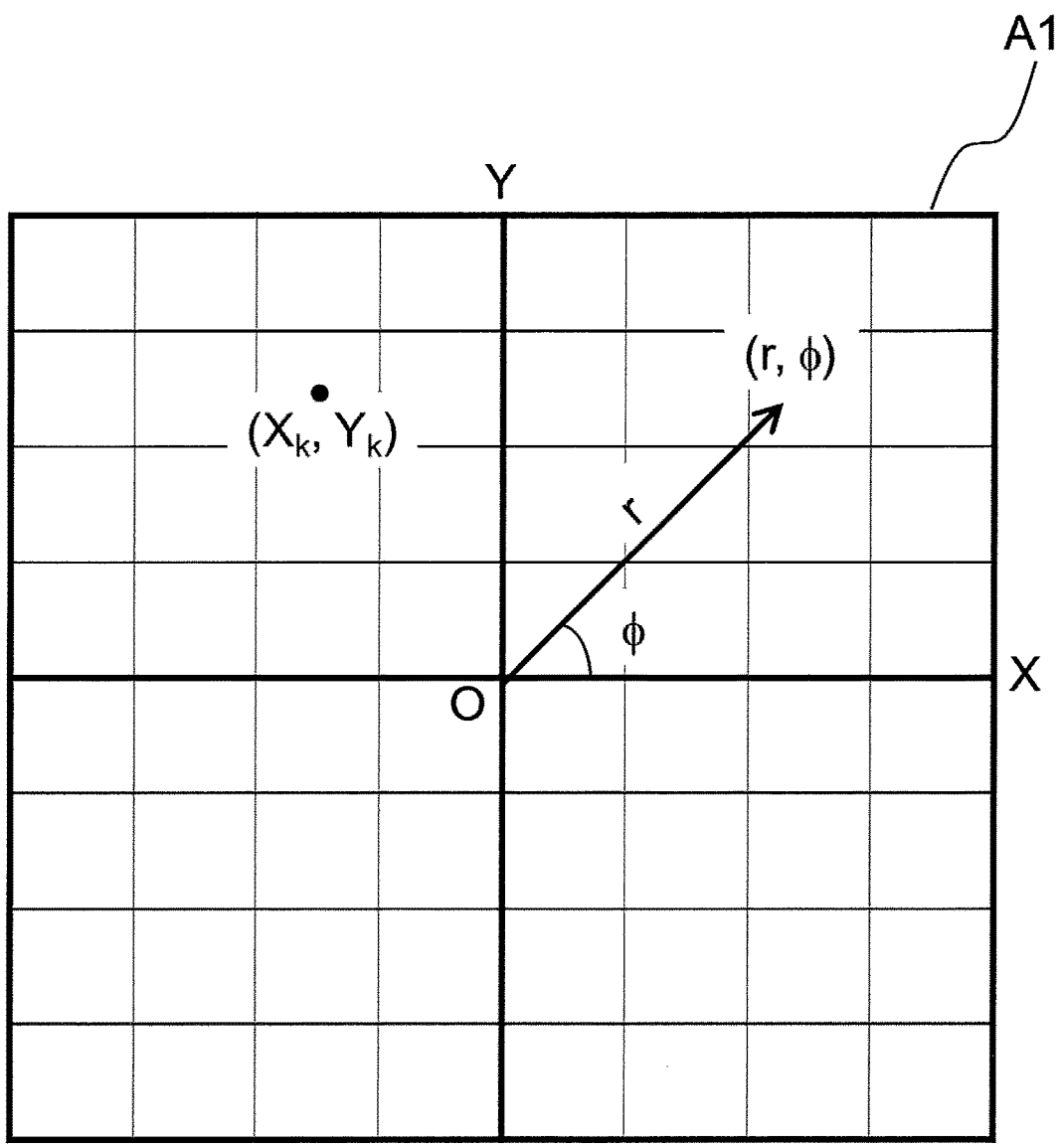
FIG. 13A is a diagram schematically illustrating a method of generating the first local map information.
Figure 13B:
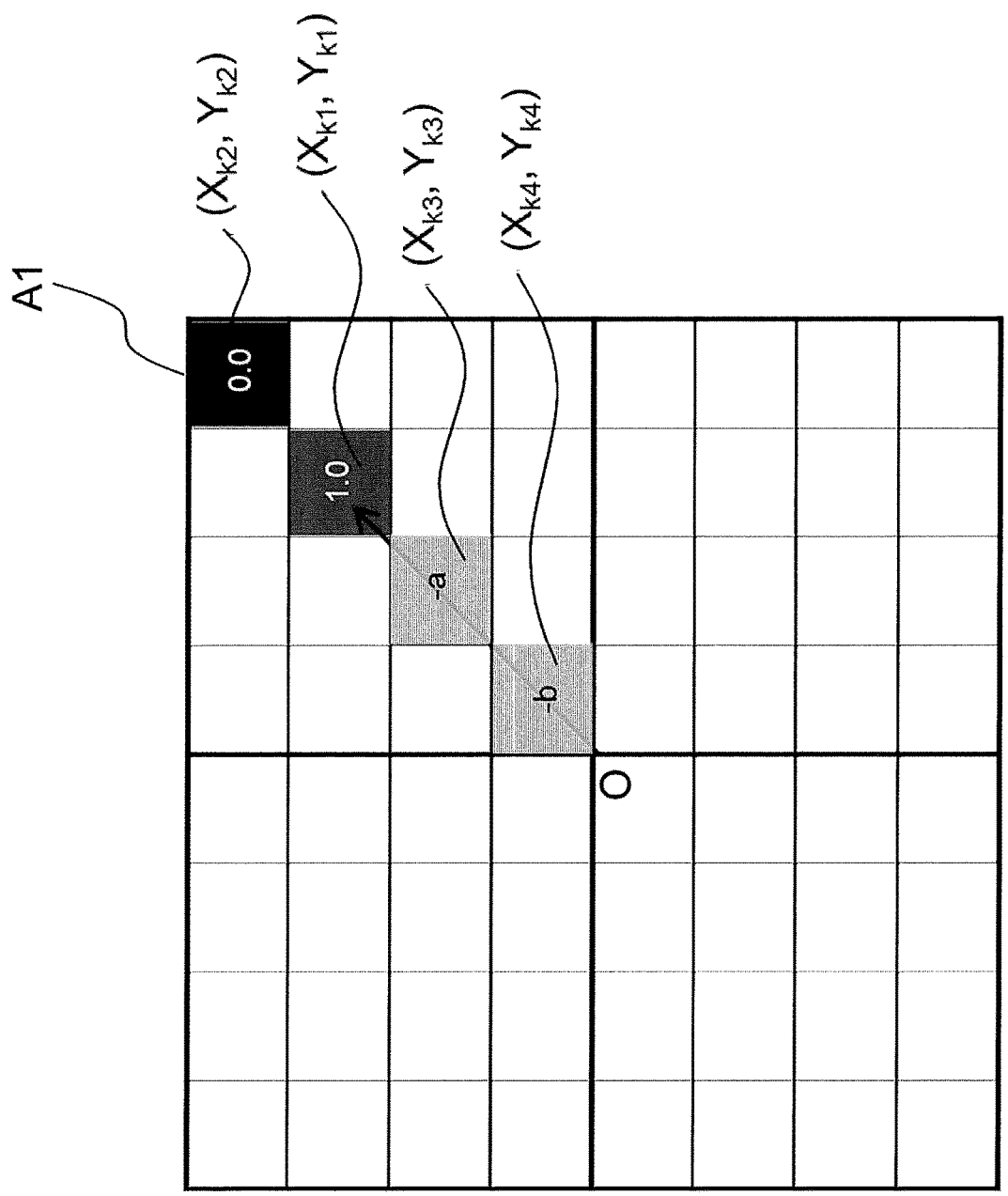
FIG. 13B is a diagram schematically illustrating a method of generating the first local map information.

Now, a method of generating the first local map information from the information regarding the front obstacle and the information regarding the rear obstacle obtained from the front detector 11 and the rear detector 13 is described with reference to FIGS. 12 to 13B. FIG. 12 is a flowchart illustrating a method of generating the first local map information. FIGS. 13A and 13B are diagrams schematically illustrating a method of generating the first local map information. Here, as illustrated in FIG. 13A, it is supposed that a first area A1 expressing a range of the first local map information is divided into a predetermined number of small areas (into 64 (8×8) small areas in FIGS. 13A and 13B). Further, center coordinates of the small areas are defined as $(X_k, Y_k)$ (k=1, 2, . . . 64). In addition, the information regarding obstacles obtained from the front detector 11 and the rear detector 13 are expressed as $(r, \varphi)$, using a distance r from the traveling unit 1 (the front detector 11 or the rear detector 13) to the obstacle, and an angle $\varphi$ of the direction of the obstacle relative to the travel direction of the traveling unit 1 (corresponding to the x axis of the first coordinate).

First, the information about the obstacle $(r, \varphi)$ is converted into coordinate values (X, Y) in the first coordinate system (Step S3232-1). This coordinate conversion can be performed by using equations $X = r \cos \varphi$ and $Y = r \sin \varphi$.

Next, it is determined which small area of the first area A1 the coordinate values $(r \cos \varphi, r \sin \varphi)$ after the coordinate conversion in Step S3232-1 exist (Step S3232-2). This can be determined by comparing the coordinate values $(r \cos \varphi, r \sin \varphi)$ with the center coordinates $(X_k, Y_k)$ of the small area. It is supposed that the coordinate values $(r \cos \varphi, r \sin \varphi)$ exist in the small area expressed by the center coordinates $(X_{k1}, Y_{k1})$ (see FIG. 13B). In other words, it is supposed that an obstacle exists in the small area expressed by the coordinates $(X_{k1}, Y_{k1})$.

Further, a probability value is assigned to each of small areas of the first area A1 (Step S3232-3). Here, the probability value means a value corresponding to a probability that an obstacle exists in each small area. In this case, assignment of the probability value to each small area is performed as illustrated in FIG. 13B, for example.

First, a probability value of 1.0 is assigned to the coordinates $(X_{k1}, Y_{k1})$ of the small area in which an obstacle exists. Next, a distance from the origin of the first coordinate to the coordinates $(X_k, Y_k)$ of each small area is calculated. The distance can be calculated from the expression $(X_k^2 + Y_k^2)^{0.5}$.

Then, a probability value of 0.0 is assigned to a small area $(X_{k2}, Y_{k2})$ having a distance $(X_k^2 + Y_k^2)^{0.5}$ larger than r (see FIG. 13B). This corresponds to the fact that it is not clear whether or not an obstacle exists in a small area having a distance larger than r.

On the other hand, a negative value as the probability value is assigned to a small area $(X_{k3}, Y_{k3})$ and a small area $(X_{k4}, Y_{k4})$ having a distance $(X_k^2 + Y_k^2)^{0.5}$ smaller than r (see FIG. 13B). The negative value becomes closer to zero as the distance $(X_k^2 + Y_k^2)^{0.5}$ becomes closer to r (as the small area becomes closer to the small area $(X_{k1}, Y_{k1})$). In the example of FIG. 13B, a probability value −a assigned to the small area $(X_{k3}, Y_{k3})$ close to the small area in which an obstacle exists is closer to zero than a probability value −b assigned to the small area $(X_{k4}, Y_{k4})$ farther from the small area in which an obstacle exists. In other words, the probability value in this case indicates that no obstacle exists in the small area and a distance from the small area to the obstacle.

Next, it is checked whether or not probability values are assigned to necessary small areas (Step S3232-4). When probability values are assigned to all necessary small areas ("Yes" in Step S3232-4), the generation of the first local map information is finished.

On the other hand, if probability values are not assigned to all necessary small areas ("No" in Step S3232-4), the process returns to Step S3232-1, and the generation of the first local map information is continued.

6-3-3. Method of Estimating Position and Travel Direction of Traveling Unit

Figure 14:
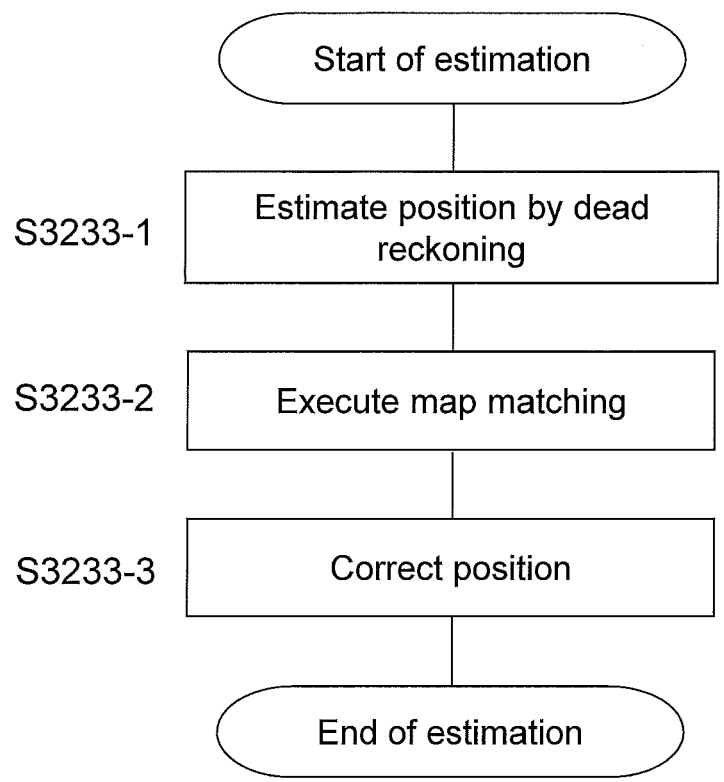
FIG. 14 is a flowchart illustrating a method of estimating a position and a travel direction of a traveling unit in a second coordinate system.
Figure 15:
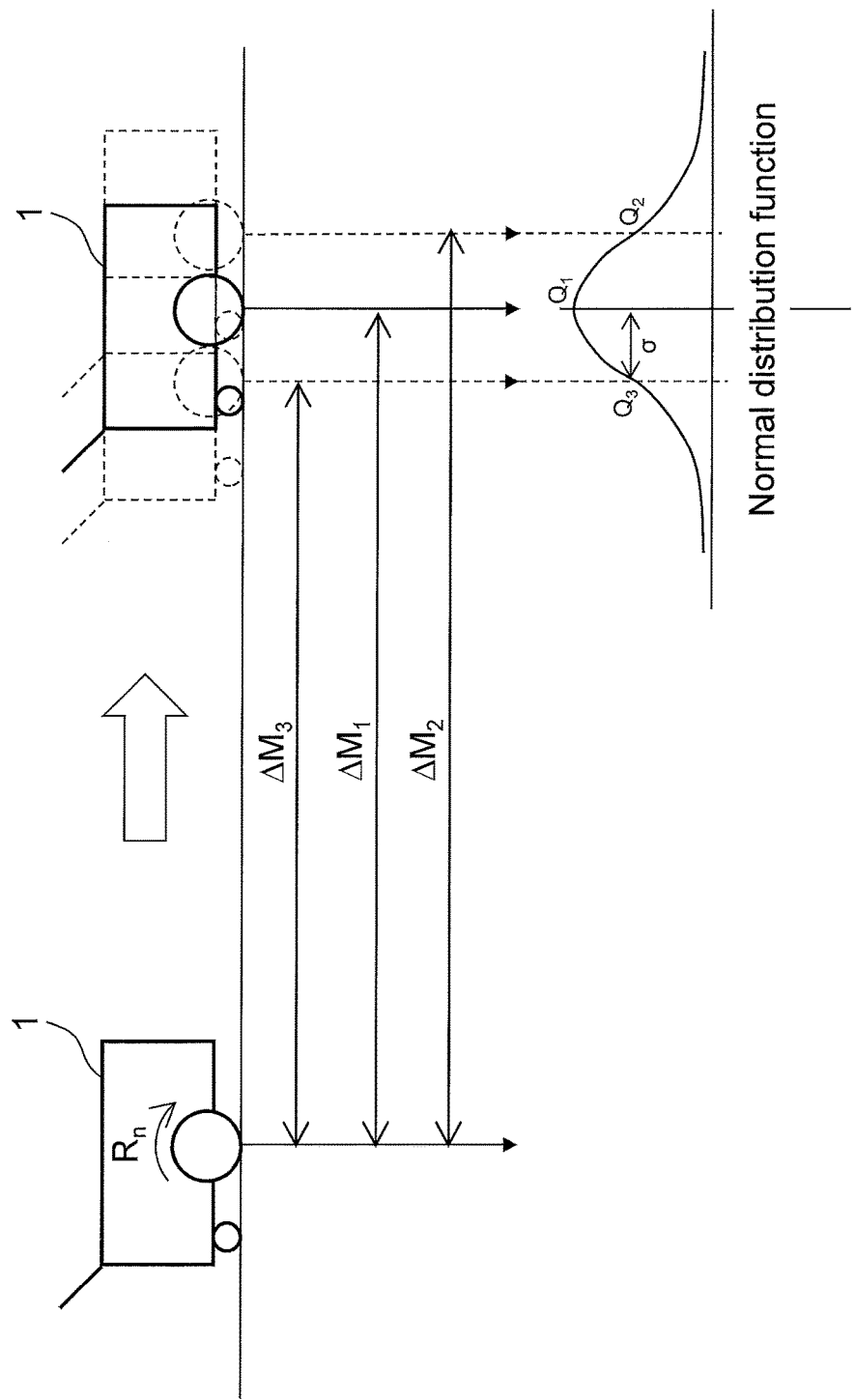
FIG. 15 is a diagram schematically illustrating a method of estimating a position by dead-reckoning in consideration of a rotation amount error.

Next, an example of the method of estimating a position and a travel direction of the traveling unit 1 in a predetermined coordinate system (in the second coordinate system) in Step S3233 of the flowchart illustrated in FIG. 10 is described with reference to FIGS. 14 and 15. FIG. 14 is a flowchart illustrating an example of the method of estimating a position and a travel direction of the traveling unit 1 in the second coordinate system (in a predetermined coordinate system). FIG. 15 is a diagram schematically illustrating the method of estimating a position by dead-reckoning in consideration of a rotation amount error.

The method of estimating a position and a travel direction of the traveling unit 1 illustrated in FIG. 14 is a method of estimating the position data based on the position data calculated from the pulse signal of the encoder 1013 and the map information generated from the signals of the front detector 11 and the rear detector 13. In addition, an example of the method of estimating the position data described below is an estimating method based on a Bayes' theorem (Bayes filter).

In the following description, a method of estimating a position and a travel direction of the traveling unit 1 at the taught data obtaining time $T_n$ is described.

When the estimation of a position and a travel direction of the traveling unit 1 starts, the position estimating unit 5145 first estimates a position and a travel direction of the traveling unit 1 at the taught data obtaining time $T_n$ based on the rotation amounts of the travel motors 1003 in Step S3233-1. In this preferred embodiment, the travel amount $(\Delta x_n, \Delta y_n, \Delta \theta_n)$ from the taught data obtaining time $T_{n-1}$ to the taught data obtaining time $T_n$ is estimated based on the pulse signal of the encoder 1013.

The estimation of a position and a travel direction based on the pulse signal from the encoder 1013 as described above may be referred to as "position estimation by dead-reckoning".

However, an error often occurs between the rotation amounts of the travel motors 1003 and a travel distance of the traveling unit 1 by the rotation of the main wheels 1001, due to an influence of "slip" or the like between main wheels 1001 and the floor surface F. Accordingly, when the travel amount $(\Delta x_n, \Delta y_n, \Delta \theta_n)$ from the taught data obtaining time $T_{n-1}$ to the taught data obtaining time $T_n$ is calculated in Step S3233-1, a certain amount of error is considered.

In this preferred embodiment, a probability of which the travel amount becomes the predetermined travel amount when the rotation amounts of the travel motors 1003 is $R_n$ is defined, and the travel amount is associated with the probability so as to consider the above-mentioned error. Specifically, a normal distribution function as a function of the travel amount $\Delta M$ is defined, in which the average (center) of the normal distribution function is $\Delta M_1$ calculated from the rotation amounts $R_n$ of the travel motors 1003 and a standard deviation of the normal distribution function is $\sigma$. Note that an influence of slip or the like between the main wheels 1001 and the floor surface F is reflected on the standard deviation $\sigma$ of the normal distribution function, and hence the standard deviation $\sigma$ may be changeable depending on a state of the floor surface F.

The association between the travel amount $\Delta M$ and the probability is determined as follows, for example. Specifically, as illustrated in FIG. 15, a probability of which the moving amount becomes $\Delta M_1$ when the travel motors 1003 rotate by the rotation amount $R_n$ is defined as having a maximum value $Q_1$ of the normal distribution function. Then, the travel amount $\Delta M_1$ and the maximum value $Q_1$ of the normal distribution function are associated with each other. Next, probabilities to be travel amounts $\Delta M_2$ and $\Delta M_3$ deviating from the travel amount $\Delta M_1$ are respectively calculated to be $Q_2$ and $Q_3$ ($Q_2<Q_1$, $Q_3<Q_1$) from the normal distribution function. The travel amount $\Delta M_2$ is associated with the probability $Q_2$, and the travel amount $\Delta M_3$ is associated with the probability $Q_3$.

Thus, in consideration of a certain amount of error in the position estimation by dead reckoning, a position and a travel direction of the traveling unit 1 are able to be estimated with high accuracy even if a slip or the like occurs between the main wheels 1001 and the floor surface F. Note that Step S3233-1 corresponds to calculating a prior probability in the Bayes' theorem.

After performing the position estimation in consideration of slip by dead reckoning in Step S3233-1, the process proceeds to Step S3233-2. In Step S3233-2, the position estimating unit 5145 evaluates a degree of matching between the second local map information at the taught data obtaining time $T_n$ stored in the storage unit 5007 and the environment map information generated at the taught data obtaining time $T_{n-1}$ (map matching).

Specifically, the position estimating unit 5145 first selects a predetermined number of travel amounts having a value of the normal distribution function defined in Step S3233-1 to be a predetermined value or larger. Then, position and travel direction of the traveling unit 1 in the second coordinate system, when moving by a selected travel amount, are calculated for each selected moving amount as a temporary position at the taught data obtaining time $T_n$. Specifically, it is supposed that the position data at the taught data obtaining time $T_{n-1}$ are $(x_{n-1}, y_{n-1}, \theta_{n-1})$, and the travel amount are $(\Delta x', \Delta y', \Delta \theta')$. Then, the temporary position is calculated to be $(x_{n-1}+\Delta x', y_{n-1}+\Delta y', \theta_{n-1}+\Delta \theta')$.

Next, the map generation unit 5345 generates the second local map information from the first local map information at the taught data obtaining time $T_n$ with respect to each of temporary positions. Note that the second local map information in this case is able to be generated in accordance with the method of converting the first local map information into the second local map information described above as description of Step S3234.

Then, a matching degree between each of the second local map information at each of the temporary positions and the environment map information generated at the taught data obtaining time $T_{n-1}$ is calculated as a numerical value (map matching). Note that Step S3233-2 corresponds to calculating likelihood in the Bayes' theorem.

By generating the map information (second local map information) in the predetermined number of temporary positions and performing map matching with the environment map information, the following effect is obtained. Even if the first local map information is fluctuated from actual obstacle information due to noise or the like added to the signal obtained from the front detector 11 and/or the rear detector 13, the position data is able to be estimated in consideration with the fluctuation of the first local map information.

After performing the map matching between the predetermined number of the second local map information and the environment map information in Step S3233-2, the process proceeds to Step S3233-3.

In Step S3233-3, the position estimating unit 5145 estimates a position and a travel direction $(x_n, y_n, \theta_n)$ (position data) of the traveling unit 1 at the taught data obtaining time $T_n$ based on the position estimation result by dead-reckoning in Step S3233-1 and the map matching result between the predetermined number of the second local map information and the environment map information in Step S3233-2.

Specifically, the position estimating unit 5145 first calculates the product of the map matching result calculated in Step S3233-2 and the normal distribution function defined in Step S3233-1. Then, a temporary position in which the product of the map matching result and the normal distribution function becomes a maximum value is estimated to be a position $(x_n, y_n, \theta_n)$ of the traveling unit 1 at the taught data obtaining time $T_n$.

In this way, by calculating the product of the map matching result (likelihood) and the position estimation result (prior probability) by dead-reckoning and estimating the temporary position in which the product value becomes maximum as an actual position of the traveling unit 1, even if the position estimation by dead-reckoning has an error and/or each map information has an error (fluctuation) due to noise in the signals of the front detector 11 and the rear detector 13, the position of the traveling unit 1 is able to be estimated with high accuracy.

Note that the above-mentioned calculation of the product of the map matching result and the normal distribution function in Step S3233-3 corresponds to calculation of a posterior probability in the Bayes' theorem.

6-4. Method of Generating Cleaning Schedule

Figure 16:
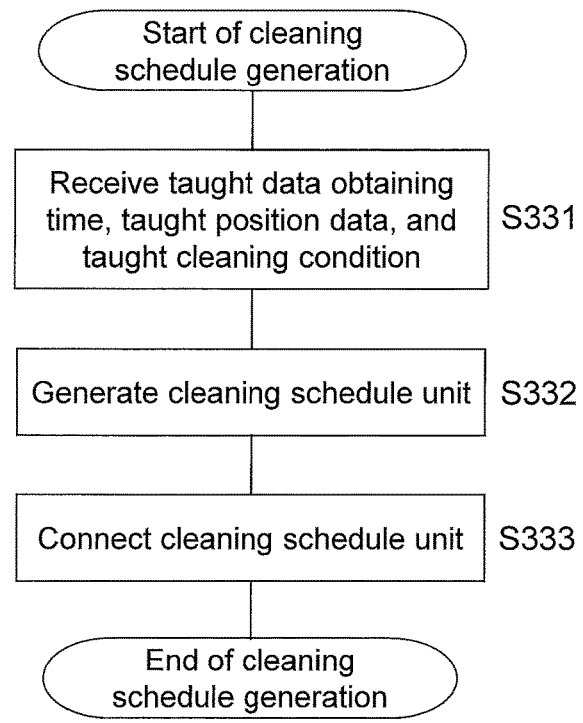
FIG. 16 is a flowchart illustrating a method of generating a cleaning schedule.
Figure 17A:
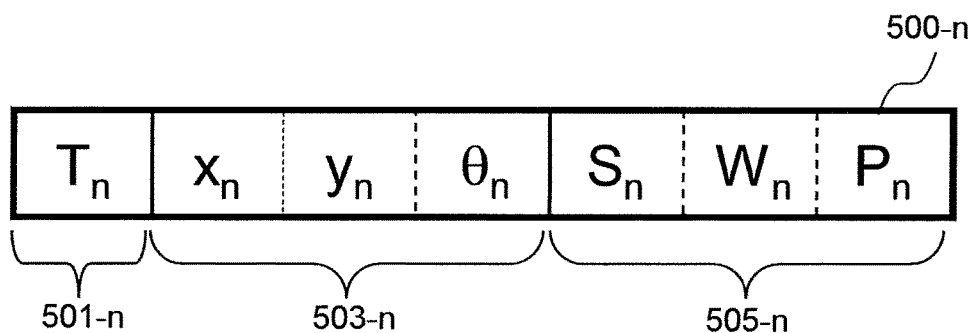
FIG. 17A is a diagram illustrating a cleaning schedule unit.

Next, a method of generating the cleaning schedule 500 in Step S33 of the flowchart illustrated in FIG. 8B is described with reference to FIGS. 16 to 17B. FIG. 16 is a flowchart illustrating the method of generating the cleaning schedule 500. FIG. 17A is a diagram illustrating a travel schedule unit (described later). FIG. 17B is a diagram illustrating the cleaning schedule to which a cleaning schedule unit is added.

First, the cleaning schedule generation unit 5025 receives the taught data obtaining time $T_n$, the taught position data $(x_n, y_n, \theta_n)$, and the taught cleaning condition $(S_n, W_n, P_n)$ (described later) from the taught data obtaining unit 5015 at the taught data obtaining time $T_n$ (Step S331). After the taught data necessary to generate the cleaning schedule 500 is obtained in Step S331, the process proceeds to Step S332.

In Step S332, the cleaning schedule generation unit 5025 generates a cleaning schedule unit 500-*n*. The cleaning schedule unit 500-*n* is a smallest unit of the cleaning schedule 500. The cleaning schedule unit 500-*n* has a data structure as illustrated in FIG. 17A. In other words, the cleaning schedule unit 500-*n* includes an elapsed time information storing area 501-*n*, a position data storing area 503-*n*, and a cleaning condition storing area 505-*n*.

The elapsed time information is stored in the elapsed time information storing area 501-*n*. When the cleaning schedule 500 is generated in Step S33, the taught data obtaining time $T_n$ is stored in the elapsed time information storing area. In other words, the cleaning schedule unit 500-*n* stores not the taught data of the whole cleaning work but the taught data at a certain elapsed time (taught data obtaining time $T_n$).

The position data storing area 503-*n* stores the position data. When the cleaning schedule 500 is generated in Step S33, the position data storing area 503-*n* stores the taught position data $(x_n, y_n, \theta_n)$ at the taught data obtaining time $T_n$.

The cleaning condition storing area 505-*n* stores the cleaning condition. When the cleaning schedule 500 is generated in Step S33, the cleaning condition storing area 505-*n* stores the taught cleaning condition $(S_n, W_n, P_n)$ at the taught data obtaining time $T_n$. Here, $S_n$ represents the supply amount of the washing liquid supplied from the washing liquid supplying unit 3003 at the taught data obtaining time $T_n$. $W_n$ represents the washing power of the cleaning unit 3 on the floor surface F at the taught data obtaining time $T_n$. $P_n$ represents the suction power of the sucking unit 3005 at the taught data obtaining time $T_n$.

In this way, the taught position data and the taught cleaning condition are associated with the time (taught data obtaining time $T_n$) so as to generate the cleaning schedule unit 500-*n*, and hence the various cleaning works are able to be taught to the autonomously traveling floor washer 100. For instance, it is possible to teach the cleaning work such as performing cleaning while slowly traveling in a predetermined travel route or performing a different cleaning work in a stopping state on the travel route.

After generating the cleaning schedule unit 500-*n* in Step S332, the process proceeds to Step S333. In Step S333, the cleaning schedule generation unit 5025 connects the cleaning schedule unit 500-*n* at the taught data obtaining time $T_n$ to the cleaning schedule 500 generated until the taught data obtaining time $T_{n-1}$.

In this case, the cleaning schedule 500 generated until the taught data obtaining time $T_{n-1}$ is stored in the storage unit 5007. Accordingly, when the cleaning schedule unit 500-*n* is connected to the cleaning schedule 500, the cleaning schedule unit 500-*n* is stored in the storage unit 5007. In addition, just after starting obtaining the taught data, there is no taught data in the cleaning schedule 500. However, in a case where the cleaning schedule 500 is an electronic file, even if the taught data is empty, if an identifier of "end of file" is recorded in the cleaning schedule 500, for example, the end of the cleaning schedule 500 is able to be determined. Accordingly, the obtained cleaning schedule unit 500-*n* (in this case, n=0) is able to be connected to the cleaning schedule 500.

Note that the connection of the cleaning schedule unit 500-*n* to the cleaning schedule 500 in this preferred embodiment is performed by adding the cleaning schedule unit 500-*n* at the taught data obtaining time $T_n$ to the next line of the cleaning schedule 500 until the taught data obtaining time $T_{n-1}$ as illustrated in FIG. 17B. However, this is not a limitation. For instance, it is possible to connect such that the cleaning schedule unit at the latest taught data obtaining time becomes the first line. In other words, on the contrary to the cleaning schedule 500 illustrated in FIG. 17B, the cleaning schedule units may be stacked in order of the taught data obtaining time so as to generate the cleaning schedule 500.

Alternatively, instead of connecting the cleaning schedule unit to the next line or stacking the cleaning schedule units, the cleaning schedule unit may be connected to the end of the cleaning schedule 500 (just before the identifier of "end of file" in a case where the cleaning schedule 500 is an electronic file that is able to be used in a microcomputer system) without inserting a carriage return. In this case, the cleaning schedule 500 is an electronic file extending in the lateral direction of the paper face of FIG. 17B.

It is also possible to use an appropriate connection method in accordance with ease of use or management of the cleaning schedule 500.

As illustrated in FIG. 8B, Step S33 is performed until all the cleaning work by the operator is finished. Accordingly, Steps S331 to S333 described above are also performed repeatedly until all the cleaning work by the operator is finished. Thus, the cleaning schedule generation unit 5025 is able to generate the cleaning schedule 500 expressing all the cleaning work by the operator and store the same in the storage unit 5007. As a result, when the cleaning work is once taught by the operator, all the cleaning work by the operator is stored as the cleaning schedule 500 in the storage unit 5007. Accordingly, after the cleaning work is once taught, the autonomously traveling floor washer 100 is controlled based on the cleaning schedule 500 such that the taught cleaning work is able to be autonomously reproduced any number of times (as long as the cleaning schedule 500 is not updated).

6-5. Method of Autonomous Cleaning

Figure 18:
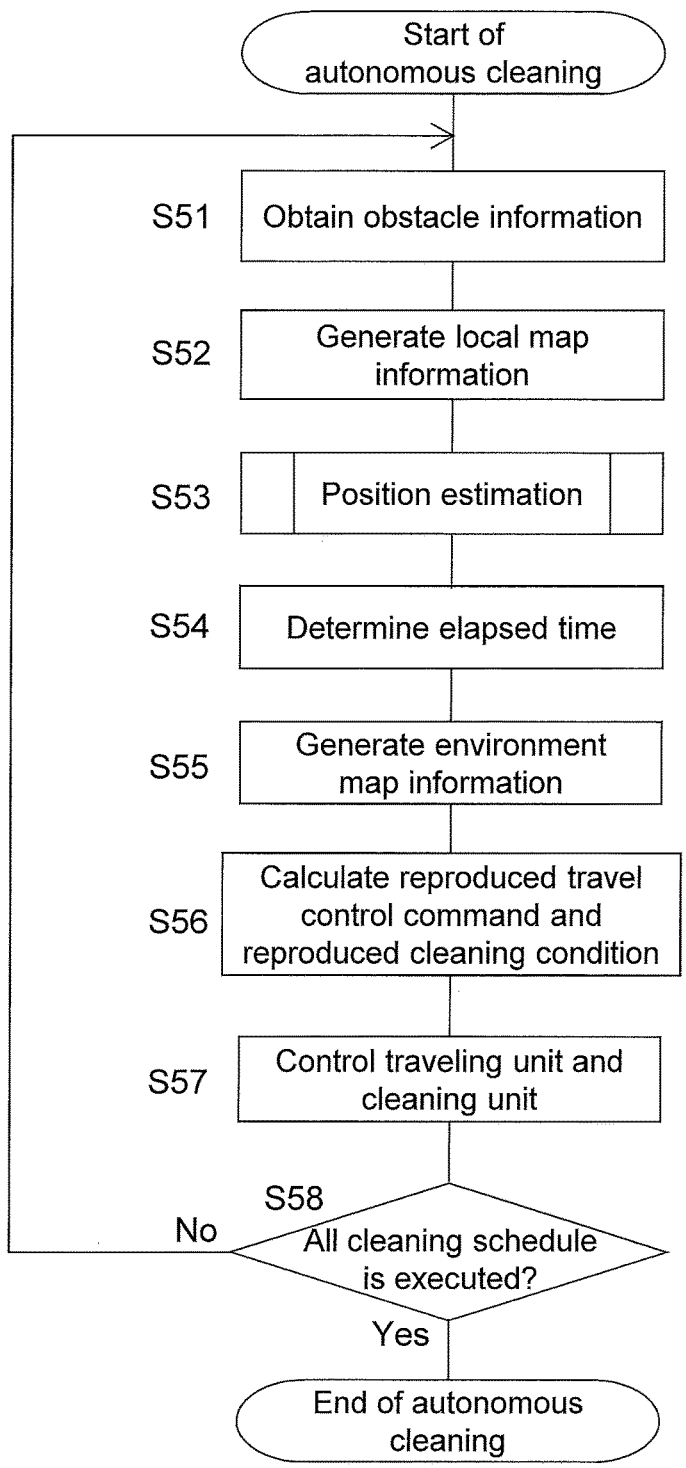
FIG. 18 is a flowchart illustrating an operation of the autonomously traveling floor washer when executing an autonomous cleaning mode.

Next, an operation of the autonomously traveling floor washer 100 when the autonomous cleaning mode is executed to reproduce the taught cleaning work (travel route and cleaning condition) in Step S5 of FIG. 8A is described with reference to FIG. 18. FIG. 18 is a flowchart illustrating the operation of the autonomously traveling floor washer 100 when the autonomous cleaning mode is executed. It is supposed that elapsed time $t_{n-1}$ from start of execution of the autonomous travel mode is determined. Here, n indicates that control for n-th autonomous cleaning has been performed.

First, the SLAM unit 5045 obtains the information regarding a front obstacle and the information regarding a rear obstacle from the front detector 11 and the rear detector 13 (Step S51).

After Step S51, the process proceeds to Step S52. In Step S52, the map generation unit 5345 generates the first local map information based on the information regarding a front obstacle and the information regarding a rear obstacle in the same manner as described above in the section 6-3-2.

After Step S52, the process proceeds to Step S53. In Step S53, the SLAM unit 5045 calculates the rotation amounts of the travel motors 1003 from the elapsed time $t_{n-1}$ to current time ($t_n$) based on the rotation amount determining pulse signal of the encoder 1013. Then, the position estimating unit 5145 estimates a position and a travel direction ($x'_n$, $y'_n$, $\theta'_n$) of the autonomously traveling floor washer 100 (traveling unit 1) in a predetermined coordinate system at the current time, based on the rotation amounts of the travel motors 1003, the environment map information at the elapsed time $t_{n-1}$, and the first local map information at the current time. A method of estimating a position and a travel direction ($x'_n$, $y'_n$, $\theta_n$) in the predetermined coordinate (second coordinate) system is the same as the method described above in the section 6-3-3.

After Step S53, the process proceeds to Step S54. In Step S54, the elapsed time determining unit 5245 determines the elapsed time $t_n$ from start of execution of the autonomous cleaning mode. The elapsed time $t_n$ is able to be determined as follows, for example. First, the position data stored in the position data storing area 503-$n$ of the cleaning schedule 500 stored in the storage unit 5007 is compared with a position and a travel direction of the traveling unit 1 ($x'_n$, $y'_n$, $\theta'_n$) estimated in Step S53. Then, the elapsed time information (taught data obtaining time) of the cleaning schedule 500 associated with the position data closest to ($x'_n$, $y'_n$, $e'_n$) is regarded as the elapsed time $t_n$.

Alternatively, two position data close to ($x'_n$, $y'_n$, $\theta'_n$) are extracted from the cleaning schedule 500, and time calculated by linear interpolation of the two extracted position data may be regarded as the elapsed time $t_n$.

By determining the elapsed time $t_n$ from execution of the autonomous cleaning mode based on the position data and the cleaning schedule 500 in this way, a predetermined cleaning work is able to be correctly performed at the taught timing and the predetermined cleaning work is able to be securely performed at the taught place. As a result, the autonomously traveling floor washer 100 is able to reproduce the taught cleaning work with high accuracy when the autonomous cleaning mode is executed.

After the elapsed time $t_n$ is determined in Step S54, the process proceeds to Step S55. In Step S55, the map generation unit 5345 generates temporary environment map information by using the reproducing map information associated with the elapsed time $t_n$ and the time before tn. This temporary environment map information and the already generated environment map information (generated at $t_{n-1}$) are added so as to generate new environment map information. The newly generated environment map information is used for the next position estimation at the elapsed time ($t_{n+1}$).

After Step S55, the process proceeds to Step S56. In Step S56, the cleaning reproduction unit 5035 calculates the reproduced travel control command and the reproduced cleaning condition at the elapsed time $t_n$.

It is supposed that the elapsed time $t_n$ is determined to be (closest to) taught data obtaining time $T_L$. In this case, the cleaning reproduction unit 5035 calculates the reproduced travel control command and the reproduced cleaning condition as follows.

First, the cleaning reproduction unit 5035 reads position data ($x_{L+1}$, $y_{L+1}$, $\theta_{L+1}$) associated with next taught data obtaining time $T_{L+1}$ from the cleaning schedule 500. Then, the cleaning reproduction unit 5035 calculates the reproduced travel control command $\Delta M_r$ at the elapsed time $t_n$ as $\Delta M_r = (x_{L+1} - x'_n, y_{L+1} - y'_n, \theta_{L+1} - \theta'_n)$.

The cleaning reproduction unit 5035 reads the cleaning condition ($S_L$, $W_L$, $P_L$) associated with the taught data obtaining time $T_L$ from the cleaning schedule 500 and determines the cleaning condition ($S_L$, $W_L$, $P_L$) as the reproduced cleaning condition at the elapsed time $t_n$.

After Step S56, the process proceeds to Step S57. In Step S57, the reproduced travel control command is transmitted to the travel control unit 5003, and the reproduced cleaning condition is transmitted to the cleaning control unit 5001. Since the terminal e is connected with the terminal f in the travel switching unit 5013 of the travel control unit 5003 when the autonomous cleaning mode is executed, the reproduced travel control command is transmitted to the motor control unit 5033 via the travel switching unit 5013. As a result, the motor control unit 5033 controls the travel motors 1003 based on the reproduced travel control command.

In addition, when the autonomous cleaning mode is executed, the terminal b is connected with the terminal c in the cleaning switching unit 5011 of the cleaning control unit 5001. Accordingly, the reproduced cleaning condition is transmitted to the cleaning control unit 5001 via the cleaning switching unit 5011. As a result, the cleaning control unit 5001 controls the cleaning unit 3 based on the reproduced cleaning condition.

After controlling the traveling unit 1 (travel motors 1003) and the cleaning unit 3 in Step S56, it is checked whether or not all the cleaning work stored in the cleaning schedule 500 is performed. By detecting the identifier in the end of the cleaning schedule 500 (for example, the identifier indicating "end of file"), it can be checked whether all the cleaning work stored in the cleaning schedule 500 is finished or not. In other words, if this identifier is detected, it is able to be determined that all the cleaning work stored in the cleaning schedule 500 is performed. On the other hand, if this identifier is not detected, it can be determined that the cleaning work is being continued.

If the cleaning reproduction unit 5035 determines that the cleaning work is being continued ("No" in Step S58), the process returns to Step S51. On the contrary, if the cleaning reproduction unit 5035 determines that all the cleaning work stored in the cleaning schedule 500 has been performed ("Yes" in Step S58), execution of the autonomous cleaning mode is finished.

Thus, the autonomously traveling floor washer 100 is able to faithfully reproduce the cleaning work stored in the cleaning schedule 500.

(7) Effect of this Preferred Embodiment

Effects of this preferred embodiment are described below.

The autonomously traveling floor washer 100 (an example of the autonomously traveling floor washer) reproduces the taught cleaning condition (an example of the taught cleaning condition) and the taught travel route so as to perform the autonomous traveling and cleaning. The autonomously traveling floor washer 100 includes the cleaning unit 3 (an example of the cleaning unit), the traveling unit 1 (an example of the traveling unit), the position estimating unit 5145 (an example of the position estimating unit), the cleaning condition teaching unit 9003 (an example of the cleaning condition teaching unit), the travel route teaching unit 7 (an example of the travel route teaching unit), the taught data obtaining unit 5015 (an example of the taught data obtaining unit), the cleaning schedule generation unit 5025 (an example of the cleaning schedule generation unit), the cleaning reproduction unit 5035 (an example of the cleaning reproduction unit), and the elapsed time determining unit 5245 (an example of the elapsed time determining unit).

The cleaning unit 3 cleans the floor surface F (an example of the floor surface) in accordance with the cleaning condition.

The traveling unit 1 travels in accordance with the operator's operation or the travel control command.

The position estimating unit 5145 estimates the position data ($x_n$, $y_n$, $\theta_n$) (an example of the position data).

The cleaning condition teaching unit 9003 accepts the input of the cleaning condition by the operator and outputs the same to the cleaning unit 3.

The travel route teaching unit 7 accepts the moving operation of the traveling unit 1 by the operator.

The taught data obtaining unit 5015 obtains the taught position data ($x_n$, $y_n$, $\theta_n$) (an example of the taught position data) and the taught cleaning condition ($S_n$, $W_n$, $P_n$) (an example of the taught cleaning condition) at the taught data obtaining time $T_n$ (an example of the taught data obtaining time) when the manual operation teaching mode is executed.

The cleaning schedule generation unit 5025 generates and stores the cleaning schedule 500 (an example of the cleaning schedule) in which the taught position data ($x_n$, $y_n$, $\theta_n$) and the taught cleaning condition ($S_n$, $W_n$, $P_n$) are associated with the taught data obtaining time $T_n$.

The cleaning reproduction unit 5035 calculates the reproduced travel control command and the reproduced cleaning condition at the elapsed time $t_n$ from start of execution of the autonomous cleaning mode (an example of the predetermined elapsed time), based on the taught data obtaining time $T_n$, the taught cleaning condition ($S_n$, $W_n$, $P_n$), and the taught position data ($x_n$, $y_n$, $\theta_n$) stored in the cleaning schedule 500, when the autonomous cleaning mode is executed. Further, the cleaning reproduction unit 5035 outputs the calculated reproduced travel control command and the calculated reproduced cleaning condition to the traveling unit 1 and the cleaning unit 3, respectively.

The elapsed time determining unit 5245 determines the taught data obtaining time $T_n$ and the elapsed time $t_n$.

This autonomously traveling floor washer 100 reproduces the cleaning condition and the travel route taught by the operator as follows.

When the operator teaches the cleaning work (when the manual operation teaching mode is executed):

(i) the taught data obtaining unit 5015 obtains the operation of the traveling unit 1 and the cleaning unit 3 by the operator at the taught data obtaining time $T_n$, and (ii) the cleaning schedule generation unit 5025 generates and stores the cleaning schedule 500 in which the taught data obtaining time $T_n$, the taught position data ($x_n$, $y_n$, $\theta_n$), and the taught cleaning condition ($S_n$, $W_n$, $P_n$) are associated with each other.

When the autonomously traveling floor washer 100 performs the autonomous cleaning (when the autonomous cleaning mode is executed):

(iii) the cleaning reproduction unit 5035 calculates the reproduced cleaning condition and the reproduced travel control command to be output at the elapsed time $t_n$, based on the taught data obtaining time $T_n$, the taught position data ($x_n$, $y_n$, $\theta_n$), and the taught cleaning condition ($S_n$, $W_n$, $P_n$) stored in the cleaning schedule 500, and (iv) the cleaning unit control unit 5031 controls the cleaning unit 3 based on the reproduced cleaning condition, while the motor control unit 5033 controls the traveling unit 1 based on the reproduced travel control command.

In the step (ii) described above, the cleaning schedule generation unit 5025 generates and stores the cleaning schedule 500. Accordingly, once the operator's operation is taught to the autonomously traveling floor washer 100, the autonomously traveling floor washer 100 is able to autonomously perform the taught cleaning work any number of times without necessity of the operator's operation (teaching).

In addition, this autonomously traveling floor washer 100 obtains and stores the taught data (the taught cleaning condition and the taught position data) at the taught data obtaining time $T_n$ in the steps (i) and (ii) described above. Further, the taught data obtaining time $T_n$ is determined by the elapsed time determining unit 5245.

In other words, when the manual operation teaching mode is executed, the autonomously traveling floor washer 100 autonomously obtains the taught data. Accordingly, the operator who teaches the cleaning work to the autonomously traveling floor washer 100 is able to teach the cleaning work (cleaning schedule 500) to the autonomously traveling floor washer 100 in the same manner as performing the cleaning work by using a conventional manual operation type floor surface washer or the like, without any consideration of generating and storing the cleaning schedule 500.

The cleaning unit 3 includes the washing liquid supplying unit 3003 (an example of the washing liquid supplying unit), the washing member 3001 (an example of the floor surface washing unit), and the sucking unit 3005 (an example of the sucking unit). The washing liquid supplying unit 3003 supplies the washing liquid to the floor surface F. The cleaning unit 3 includes the washing member 3001 (an example of the washing member) pressed to the floor surface F while rotating to wash the floor surface F. The sucking unit 3005 sucks the washing liquid and the like on the floor surface F.

In addition, in this case, in the manual operation teaching mode, the supply amount $S_n$ (an example of the supply amount) of the washing liquid supplied from the washing liquid supplying unit 3003, the washing power $W_n$ (an example of the washing power) of the cleaning unit 3 on the floor surface F, and the washing liquid sucking power $P_n$ (an example of the suction power) of the sucking unit 3005 are arbitrarily adjustable as the taught cleaning condition.

Thus, the cleaning unit 3 is able to perform various cleaning works (namely, various cleaning conditions).

The autonomously traveling floor washer 100 further includes the display unit 9005 (an example of the display unit). The display unit 9005 displays the cleaning condition. Thus, the operator who teaches the cleaning schedule 500 to the autonomously traveling floor washer 100 is able to perform the cleaning work while checking the cleaning condition.

The autonomously traveling floor washer 100 further includes the squeegee unit 3007 (an example of the squeegee unit). The squeegee unit 3007 is attached in an arbitrarily adjustable manner whether to contact with the floor surface F or to be spaced away from the floor surface F. In this case, the squeegee unit 3007 is spaced away from the floor surface F when traveling backward. Thus, the autonomously traveling floor washer 100 is able to collect liquid such as the washing liquid and the like on the floor surface F.

The autonomously traveling floor washer 100 further includes the cleaning schedule modifying unit 5009 (an example of the cleaning schedule modifying unit). The cleaning schedule modifying unit 5009 modifies the taught cleaning condition, the taught position data, and the taught data obtaining time $T_n$ of the cleaning schedule 500. Thus, it is possible to modify the cleaning schedule 500 after teaching the cleaning schedule 500.

In the autonomously traveling floor washer 100, the elapsed time from the start of execution of the autonomous cleaning mode is determined based on the position data estimated by the position estimating unit 5145. Thus, the autonomously traveling floor washer 100 is able to autonomously reproduce the cleaning work while accurately grasping the timing and the place to perform the taught cleaning condition when the autonomous cleaning mode is executed.

The cleaning schedule 500 is used to calculate the reproduced cleaning condition and the reproduced travel control command at the elapsed time $t_n$ (an example of the predetermined timing) when the autonomous traveling and cleaning are performed.

The cleaning schedule 500 includes the data structure including the elapsed time information storing area 501-$n$ (an example of the elapsed time information storing area), the cleaning condition storing area 505-$n$ (an example of the cleaning condition storing area), and the position data storing area 503-$n$ (an example of the position data storing area). The elapsed time information storing area 501-$n$ stores the taught data obtaining time $T_n$ (an example of the elapsed time information). The cleaning condition storing area 505-$n$ stores the taught cleaning condition ($S_n$, $W_n$, $P_n$) (an example of the cleaning condition) at the taught data obtaining time $T_n$. The position data storing area 503-$n$ stores the taught position data ($x_n$, $y_n$, $\theta_n$) (an example of the position data) at the taught data obtaining time $T_n$.

In addition, the elapsed time $t_n$ is determined based on the taught data obtaining time $T_n$ stored in the elapsed time information storing area 501-$n$. The cleaning condition (reproduced cleaning condition) at the elapsed time $t_n$ is calculated based on the taught cleaning condition ($S_n$, $W_n$, $P_n$) that is stored in the cleaning condition storing area 505-$n$ and associated with the taught data obtaining time $T_n$ corresponding to the elapsed time $t_n$. Further, the travel control command (reproduced travel control command) at the elapsed time $t_n$ is calculated based on the taught position data ($x_n$, $y_n$, $\theta_n$) that is stored in the position data storing area 503-$n$ and associated with the taught data obtaining time $T_n$ corresponding to the elapsed time $t_n$.

In the cleaning schedule 500 including the data structure described above, the taught cleaning condition ($S_n$, $W_n$, $P_n$) and the taught position data ($x_n$, $y_n$, $\theta_n$) are associated with the taught data obtaining time $T_n$ (an example of the elapsed time from start of control of the cleaning unit and the traveling unit 1) and are stored. Thus, it is possible to teach various cleaning work to the autonomously traveling floor washer 100.

In addition, when the autonomous cleaning mode is executed, the cleaning condition (reproduced cleaning condition) and the travel control command (reproduced travel control command) at the elapsed time $t_n$ are calculated based on the taught cleaning condition ($S_n$, $W_n$, $P_n$) and the taught position data ($x_n$, $y_n$, $\theta_n$) that are stored in the cleaning schedule 500 and associated with the taught data obtaining time $T_n$ corresponding to the elapsed time $t_n$. Thus, the autonomously traveling floor washer is able to autonomously reproduce various cleaning works.

A method of generating the cleaning schedule 500 includes the steps of: causing the autonomously traveling floor washer 100 to perform the cleaning work based on the taught cleaning condition set by the operator; causing the autonomously traveling floor washer 100 to travel based on the operator's operation; estimating the taught position data ($x_n$, $y_n$, $\theta_n$) including information regarding a position and a direction of the autonomously traveling floor washer 100 on the travel route in a predetermined coordinate system determined in the autonomously traveling floor washer 100; obtaining the taught position data and the taught cleaning condition as the cleaning condition when the cleaning work is being performed, at the taught data obtaining time $T_n$ determined in the autonomously traveling floor washer 100; and storing the taught position data and the taught cleaning condition in association with the taught data obtaining time $T_n$ so as to generate the cleaning schedule 500.

With the method of generating the cleaning schedule described above, it is possible to easily generate the cleaning schedule 500 in which the taught position data and the taught cleaning condition are associated with the taught data obtaining time $T_n$.

(8) Other Preferred Embodiments

Although preferred embodiments of the present invention have been described above, the present invention is not limited to the preferred embodiments described above and can be modified variously without deviating from the spirit of the present invention. In particular, various features, elements and characteristics of the plurality of preferred embodiments and variations described in this specification can be arbitrarily combined as necessary.

(A) Obtaining of Taught Cleaning Condition

The autonomously traveling floor washer 100 of the first preferred embodiment uses the setting of the cleaning condition teaching unit 9003 as the taught cleaning condition, but this is not a limitation. The taught cleaning condition may be determined based on a detection amount of a sensor or the like.

For instance, when the manual operation teaching mode is executed, it is possible to detect the rotation speed of the washing member rotating motor 3011 and/or the pressing force of the washing member pressing actuator 3021, and to set the washing power determined based on the detection amount as the washing power Wn of the taught cleaning condition. In addition, it is possible to detect the flow rate of the washing liquid by a flow meter provided to the washing liquid supplying pump 3013, and to set a detected flow rate as the supply amount $S_n$ of the washing liquid of the taught cleaning condition. Further, it is possible to detect a rotation speed and/or an output of the suction motor 3015 by a sensor or the like, and to set the detected rotation speed and/or output as the suction power $P_n$ of the taught cleaning condition.

By setting the amount detected by the sensor or the like as the taught cleaning condition in this way, it is possible to obtain the taught data based on actual rotation speed, pressing force, flow rate, and the like.

(B) Method of Determining Elapsed Time $t_n$ when Autonomous Cleaning Mode is Executed In the autonomously traveling floor washer 100 of the first preferred embodiment, the elapsed time determining unit 5245 determines (estimates) the elapsed time $t_n$ from start of execution of the autonomous cleaning mode based on the position data estimated by the position estimating unit 5145, but this is not a limitation. In particular, if the position can be accurately estimated only from the information of the encoder 1013 or the front detector 11 and the rear detector 13, in such a case where it is almost unnecessary to consider slip between the main wheels 1001 and the floor surface F, and there is no obstacle in the environment, and it is possible to accurately estimate the position data only by position estimation by dead reckoning, it is not necessary to determine the elapsed time $t_n$ based on the position data estimated by the position estimating unit 5145.

In this case, the elapsed time determining unit 5245 may determine the elapsed time $t_n$ by using the clock function of the microcomputer system of the control unit 5. Thus, the calculation to determine (estimate) the elapsed time $t_n$ can be omitted. As a result, calculation load of the control unit 5 is reduced, and hence the processing speed of the control unit 5 (autonomously traveling floor washer 100) is improved.

(C) Obtaining of Taught Position Data and Taught Cleaning Condition

In the first preferred embodiment, the taught data obtaining unit 5015 of the autonomously traveling floor washer 100 obtains both the taught position data and the taught cleaning condition at the taught data obtaining time $T_n$ when the manual operation teaching mode is executed, but this is not a limitation. The taught data obtaining unit 5015 may obtain the taught cleaning condition only at a predetermined taught data obtaining time $T_n$.

This method of obtaining the taught data can be applied to a case, for example, where when the autonomous cleaning mode is executed, the position of the traveling unit 1 (autonomously traveling floor washer 100) on the taught travel route is checked in detail while the autonomously traveling floor washer 100 travels to perform the cleaning work. Alternately, it can be applied also to a case where the cleaning condition is not changed for a long period of time.

In this method of obtaining the taught data, for example, it is possible to obtain the taught position data at the taught data obtaining time $T_n$ while to obtain the taught cleaning condition only when a key operation of the cleaning condition teaching unit 9003 is performed. With this method of obtaining the taught data, the taught data can be efficiently obtained without obtaining redundant data. As a result, the data amount of the cleaning schedule 500 is significantly reduced.

Various preferred embodiments of the present invention can be widely applied to autonomously traveling floor washers to perform autonomous traveling and cleaning by reproducing taught cleaning condition and travel route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomously traveling floor washer that autonomously travels and cleans by reproducing a taught cleaning condition and a taught travel route, the autonomously traveling floor washer comprising:
   a cleaning unit that cleans a floor surface in accordance with a cleaning condition;
   a traveling unit that travels in accordance with an operator's operation or a travel control command;
   a position estimating unit that estimates position data including information regarding a position and a direction of the traveling unit on the travel route in a predetermined coordinate system;
   a cleaning condition teaching unit that accepts an input of the cleaning condition by the operator and outputs the cleaning condition to the cleaning unit;
   a travel route teaching unit that accepts an operation of moving the traveling unit by the operator;
   a taught data obtaining unit that obtains taught position data as the position data estimated by the position estimating unit and a taught cleaning condition as the cleaning condition taught by the cleaning condition teaching unit at a taught data obtaining time when a manual operation teaching mode is executed in which the operator's operation teaches the cleaning condition and the travel route;
   a cleaning schedule generation unit that generates and stores a cleaning schedule in which the taught position data and the taught cleaning condition are associated with the taught data obtaining time;
   a cleaning reproduction unit that calculates a reproduced cleaning condition and a reproduced travel control command at a predetermined elapsed time from start of execution of an autonomous cleaning mode based on the taught data obtaining time, the taught cleaning condition, and the taught position data stored in the cleaning schedule, and to output the reproduced cleaning condition and the reproduced travel control command to the cleaning unit and the traveling unit, respectively, when the autonomous cleaning mode is executed in which autonomous traveling and cleaning is performed; and
   an elapsed time determining unit that determines the taught data obtaining time and the predetermined elapsed time; wherein
   the elapsed time from start of execution of the autonomous cleaning mode is determined based on the position data estimated by the position estimating unit.

2. The autonomously traveling floor washer according to claim 1, wherein
   the cleaning unit includes a washing liquid supplying unit that supplies washing liquid to the floor surface, a floor surface washing unit including a washing member to be pressed to the floor surface while rotating to wash the floor surface, and a sucking unit that sucks the washing liquid on the floor surface; and
   a supply amount of the washing liquid supplied from the washing liquid supplying unit, a floor surface washing power of the floor surface washing unit, and a washing liquid sucking power of the sucking unit are arbitrarily adjustable as the cleaning condition.

3. The autonomously traveling floor washer according to claim 1, further comprising a display unit that displays the cleaning condition.

4. The autonomously traveling floor washer according to claim 1, further comprising a squeegee unit attached to be capable of arbitrarily setting whether to contact with the floor surface or to be spaced away from the floor surface; wherein
   the squeegee unit is spaced away from the floor surface when traveling backward.

5. The autonomously traveling floor washer according to claim 1, further comprising a cleaning schedule modifying unit that modifies the taught cleaning condition, the taught position data, and the taught data obtaining time of the cleaning schedule.

6. The autonomously traveling floor washer according to claim 1, wherein the elapsed time from start of execution of the autonomous cleaning mode is the taught data obtaining time associated with the taught position data closest to the position data estimated by the position estimating unit.

7. The autonomously traveling floor washer according to claim 1, wherein the elapsed time from start of execution of the autonomous cleaning mode is time calculated by linear interpolation of the two taught position data closest to the position data estimated by the position estimating unit.

8. A method of autonomous cleaning for causing an autonomously traveling floor washer to autonomously travel and clean in accordance with a cleaning schedule, the autonomously traveling floor washer including a traveling unit and a cleaning unit that cleans a floor surface, the cleaning schedule being a schedule in which a taught cleaning condition and a taught position data are stored and associated with taught data obtaining time, the taught cleaning condition being a cleaning condition taught by an operator, the taught position data being position data on a travel route taught by the operator, and the taught data obtaining time being time at which the taught position data and the taught cleaning condition are obtained, the method of autonomous cleaning including:

estimating a position of the autonomously traveling floor washer;

determining elapsed time from start of execution of an autonomous cleaning mode based on the estimated position of the autonomously traveling floor washer, the autonomous cleaning mode being a mode in which the autonomously traveling floor washer autonomously travels and cleans;

calculating a reproduced cleaning condition and a reproduced travel control command at the elapsed time based on the taught data obtaining time, the taught cleaning condition, and the taught position data; and controlling the traveling unit based on the reproduced travel control command and controlling the cleaning unit based on the reproduced cleaning condition.

9. A non-transitory computer readable medium storing thereon a program for causing a computer to execute the method of autonomous cleaning according to claim 8.

\* \* \* \* \*